United States Patent [19]

Deitz et al.

[11] Patent Number: 5,629,410
[45] Date of Patent: May 13, 1997

[54] REACTIVE AZO DYES CONTAINING AN AMINOCARBONYL OR AMINOSULFONYL BRIDGE MEMBER

[75] Inventors: Rolf Deitz, Kandern; Bernhard Müller, Efringen-Kirchen, both of Germany; Athanassios Tzikas, Pratteln, Switzerland

[73] Assignee: Ciba-Geigy Corporation, Tarrytown, N.Y.

[21] Appl. No.: 541,010

[22] Filed: Oct. 11, 1995

[30] Foreign Application Priority Data

Oct. 13, 1994 [CH] Switzerland ............... 3081/94

[51] Int. Cl.⁶ .............. C09B 62/513; C09B 67/22; D06P 1/38
[52] U.S. Cl. .............. 534/642; 534/632; 534/634; 534/635; 534/636; 534/637; 8/549
[58] Field of Search ............... 534/632, 637, 534/642; 8/549

[56] References Cited

U.S. PATENT DOCUMENTS

| | | | |
|---|---|---|---|
| 4,242,258 | 12/1980 | Noll et al. | 534/642 |
| 5,180,817 | 1/1993 | Ogino et al. | 534/811 |
| 5,493,010 | 2/1996 | Herd et al. | 534/642 |

FOREIGN PATENT DOCUMENTS

| | | |
|---|---|---|
| 0620833 | 11/1962 | Belgium . |
| 965902 | 6/1957 | Germany . |
| 0276578 | 10/1964 | Netherlands . |
| 1203824 | 9/1970 | United Kingdom . |

OTHER PUBLICATIONS

Guenthard, Chemical Abstracts, 63: 10099h (1965).
Geigy, Chemical Abstracts, 59: 6554h (1963).
Guenthard, Chemical Abstracts, 70: 97952t (1969).
Geigy, Chemical Abstracts, 73: 46633u (1970).
Chem. Abstract, 59: 7690h (BE-A 0,620,833) (1963).
Chem. Abstract, 53: 10783(a) (1959).

*Primary Examiner*—Fiona T. Powers
*Attorney, Agent, or Firm*—Kevin T. Mansfield

[57] ABSTRACT

The invention relates to compounds of formula

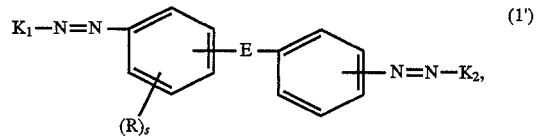

(1')

wherein the variables are as claimed in the claims and which are suitable as fibre-reactive dyes for dyeing a wide range of fibre materials.

11 Claims, No Drawings

REACTIVE AZO DYES CONTAINING AN AMINOCARBONYL OR AMINOSULFONYL BRIDGE MEMBER

The present invention relates to novel reactive dyes, to a process for their preparation and to the use thereof.

The practice of dyeing with reactive dyes in recent years has led to more exacting demands being made of the quality of the dyeings obtained and to the efficiency of the dying process. Consequently there is a continuing need to provide novel reactive dyes that have enhanced properties, especially with respect to application.

At the present time it is required of reactive dyes that they shall have sufficient substantivity for the substrate to be dyed and at the same time have the property that unfixed dye is easily washed off. They are further required to afford a good tinctorial yield and have high reactivity to give in particular dyeings of good fixation. The known dyes do not meet these requirements in all respects.

It is therefore the object of this invention to provide novel, improved reactive dyes for dyeing and printing fibre materials that have the qualities referred to above to a high degree. The novel dyes shall in particular be distinguished by high fixation yields and high fibre-bond stability, and it shall furthermore be possible to wash-off unfixed dye in the fibre with ease. The novel dyes shall also produce dyeings with good allround fastness properties, preferably light- and wetfastness properties.

It has been found that this object is substantially achieved with the novel reactive dyes defined below.

The invention relates to compounds of formula

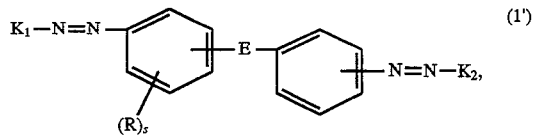

(1')

wherein $K_1$ and $K_2$ are each independently of the other the radical of a coupling component, at least one of which carries a fibre-reactive group, E is the —NH—CO—, —NH—SO$_2$— or —SO$_2$—NH—SO$_2$— group, $(R)_s$ denotes s identical or different substituents selected from the group consisting of sulfo, hydroxy, $C_1$–$C_4$alkyl, $C_1$–$C_4$alkoxy, halogen and cyano, and s is 0, 1 or 2, with the proviso that the compounds of formula (1) contain at least one sulfo or sulfato group.

Sulfo will be understood as broadly embracing the free —SO$_3$H acid as well as any form of salt, typically an alkali metal salt, alkaline earth metal salt or ammonium salt, or the salt of an organic amine. Typical examples are the sodium, potassium, lithium or ammonium salt, or the salt of triethanolamine.

$C_1$–$C_4$Alkyl is typically methyl, ethyl, n-propyl or isopropyl, or n-, iso-, sec- or tert-butyl. $C_1$–$C_4$Alkoxy is typically methoxy, ethoxy, n-propoxy or isopropoxy, or n-, iso-, sec- or tert-butoxy. Methoxy or ethoxy are preferred. Halogen is typically bromo or chloro.

The novel reactive dyes are preferably those of formula

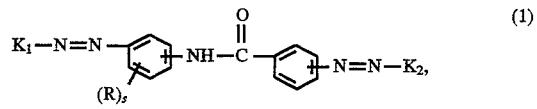

(1)

wherein $K_1$, $K_2$ and $(R)_s$ each have the meanings given above.

R is preferably sulfo, hydroxy, methyl or methoxy. Sulfo is particularly preferred.

s is preferably 1 or 2.

$K_1$ and $K_2$ are each independently of the other typically the radical of a coupling component of the benzene, naphthalene, naphthylazobenzene, phenylazonaphthalene, 4-alkyl-6-hydroxypyrid-2-one, 2,5-diamino-4-alkylpyridine, 1-arylpyrazol-5-one or 1-aryl-5-aminopyrazole series, which component may carry customary substituents of dyes and, if appropriate, one or more than one fibre-reactive group.

Illustrative examples of such substituents are: alkyl groups containing 1 to 12, preferably 1 to 4, carbon atoms, typically methyl, ethyl, n-propyl or isopropyl, or n-, iso-, sec- or tert-butyl, alkoxy groups containing 1 to 8, preferably 1 to 4, carbon atoms, typically methoxy, ethoxy, n-propoxy or isopropoxy, or n-, iso-, sec- or tert-butoxy; $C_1$–$C_4$alkoxy which is typically substituted by hydroxy, $C_1$–$C_4$alkoxy or sulfato, e.g. 2-hydroxyethoxy, 3-hydroxypropoxy, 2-sulfatoethoxy, 2-methoxyethoxy or 2-ethoxyethoxy; acylamino groups containing 2 to 8 carbon atoms, preferably $C_2$–$C_4$alkanoylamino groups such as acetylamino or propionylamino, benzoylamino or $C_2$–$C_4$alkoxycarbonylamino groups, typically methoxycarbonylamino or ethoxycarbonylamino, amino; N-mono-$C_1$–$C_4$alkylamino or N,N-di-$C_1$–$C_4$alkylamino which are each unsubstituted or substituted in the alkyl moiety by e.g. hydroxy, sulfo, sulfato or $C_1$–$C_4$alkoxy, typically methylamino, ethylamino, N,N-dimethylamino or N,N-diethylamino, sulfomethylamino, β-hydroxyethylamino, N,N-bis(2-hydroxyethylamino), N-β-sulfatoethylamino; phenylamino which is unsubstituted or substituted in the phenyl moiety by methyl, methoxy, halogen or sulfo; N-$C_1$–$C_4$-alkyl-N-phenylamino which is unsubstituted or substituted in the alkyl moiety by hydroxy, sulfo or sulfato or in the phenyl moiety by methyl, methoxy, halogen or sulfo, e.g. N-methyl-N-phenylamino, N-ethyl-N-phenylamino, N-β-hydroxyethyl-N-phenylamino or N-β-sulfoethyl-N-phenylamino; unsubstituted or sulfosubstituted naphthylamino; alkanoyl groups containing 2 to 8, preferably 2 to 4, carbon atoms, typically acetyl or propionyl, benzoyl; alkoxycarbonyl containing 1 to 4 carbon atoms in the alkoxy moiety, typically methoxycarbonyl or ethoxycarbonyl; alkylsulfonyl containing 1 to 4 carbon atoms, typically methylsulfonyl or ethylsulfonyl, phenylsulfonyl or naphthylsulfonyl; trifluoromethyl; nitro; cyano; hydroxy; halogen, typically fluoro, chloro or bromo; carbamoyl, N-$C_1$–$C_4$alkylcarbamoyl, typically N-methylcarbamoyl or N-ethylcarbamoyl, sulfamoyl, N-$C_1$–$C_4$alkylsulfamoyl such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-bis(β-hydroxyethyl)sulfamoyl, N-phenylsulfamoyl; ureido, carboxy, sulfomethyl, sulfo or sulfato as well as fibre-reactive radicals. In addition, the alkyl radicals may be interrupted by oxygen (—O—) or an amino group (—NH—, —N($C_1$–$C_4$-alkyl)—).

Fibre-reactive dyes will be taken to mean those radicals which are capable of reacting with the hydroxyl groups of cellulose, with the amino, carboxy, hydroxy and thiol groups in wool and silk, or with the amino and, where present, the carboxy groups of synthetic polyamides to form covalent chemical bonds. As a general rule, the fibre-reactive radicals are bound to the dye radical direct or through a linking group. Suitable fibre-reactive radicals are typically those containing at least one removable substituent at an aliphatic, aromatic or heterocyclic radical or wherein the cited radicals contain a radical suitable for reaction with the fibre material, typically a vinyl radical.

A fibre-reactive radical in $K_1$ or $K_2$ is preferably a radical of formula $$-SO_2-Y, \quad (2a)$$

$$-CONR_2-(CH_2)_n-SO_2-Y \quad (2b)$$

or

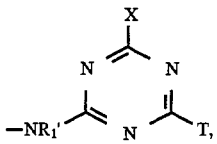
(2c)

wherein X is halogen, 3-carboxypyridin-1-yl or 3-carbamoylpyridin-1-yl, T independently has the meaning of X or is hydroxy, $C_1-C_4$alkoxy, phenoxy, $C_1-C_4$alkylthio, morpholino, amino which is unsubstituted or substituted by non-reactive radicals, or a reactive radical of formula $$\underset{R_2}{\overset{R_3}{-N\text{-alk-}SO_2-Y,}} \quad (3a)$$

$$\underset{R_1}{-N\text{-alk-}Q\text{-alk'-}SO_2-Y,} \quad (3b)$$

$$\underset{R_1}{-N\text{-arylene-}SO_2-Y,} \quad (3c)$$

$$\underset{R_1}{-N\text{-arylene-}(alk)_m\text{-}W\text{-alk'-}SO_2-Y} \quad (3d)$$

$$-N\underset{\_\_\_}{\diagup\overset{\frown}{\diagdown}}N\text{-alk-}SO_2-Y \quad (3e)$$

or $$\underset{R_1}{-N\text{-arylene-}NH-CO-Y_1,} \quad (3f)$$

$R_1$ and $R_1'$ are each independently of the other hydrogen or $C_1-C_4$alkyl, $R_1$ and $R_1'$ are each independently of the other hydrogen or $C_1-C_4$alkyl, $R_2$ is hydrogen, $C_1-C_4$-alkyl which is unsubstituted or substituted by hydroxy, sulfo, sulfato, carboxy or cyano, or a radical

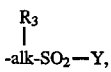

$R_3$ is hydrogen, hydroxy, sulfo, sulfato, carboxy, cyano, halogen, $C_1-C_4$alkoxycarbonyl, $C_1-C_4$alkanoyloxy, carbamoyl or the —$SO_2$—Y group, alk and alk' are each independently of the other $C_1-C_6$alkylene, arylene is a phenylene or naphthylene radical which is each unsubstituted or substituted by sulfo, carboxy, $C_1-C_4$alkyl, $C_1-C_4$alkoxy or halogen, $Y_1$ is a —$CHX_2$—$CH_2X_2$ or —$CX_2$=$CH_2$ group, and $X_2$ is chloro or bromo, Q is —O— or —$NR_1$—, wherein $R_1$ has the meaning given above, W is a —$SO_2$—$NR_2$—, —$CONR_2$— or —$NR_2CO$— group, n is an integer from 1 to 6, and m is 0 or 1, Y is vinyl or a —$CH_2$—$CH_2$—U radical, and U is leaving group which is removable with alkali.

Suitable leaving groups U which are removable with alkali are typically halogen, e.g. chloro or bromo, acyloxy such as acetoxy or benzoyloxy, phosphato, sulfato or thiosulfato.

Accordingly, typical examples of suitable radicals Y are vinyl, β-bromoethyl or β-chloroethyl, β-acetoxyethyl, β-benzoyloxyethyl, β-phosphatoethyl, β-sulfatoethyl and βthiosulfatoethyl. Y is preferably vinyl or β-sulfatoethyl.

$R_2$ is preferably hydrogen or $C_1-C_4$alkyl, typically methyl, ethyl, propyl, isopropyl, butyl, isobutyl, sec-butyl or tert-butyl and, most preferably, hydrogen, methyl or ethyl. $R_2$ is most preferably hydrogen.

n is preferably 2, 3 or 4 and, more particularly, 2 or 3.

T defined as amino which is unsubstituted or substituted by non-reactive radicals may be amino, N-$C_1-C_4$alkylamino or N,N-di-$C_1-C_4$alkylamino in which the alkyl moiety is unsubstituted or substituted e.g. by sulfo, sulfato, hydroxy, carboxy or phenyl; cyclohexylamino, N-$C_1-C_4$alkyl-N-phenylamino or phenylamino or naphthylamino in which phenyl or naphthyl are unsubstituted or substituted by e.g. $C_1C_4$alkyl, $C_1-C_4$alkoxy, $C_2-C_4$alkanoylamino, carboxy, sulfo or halogen.

Illustrative examples of suitable non-reactive amino radicals T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or isopropoxy as well as hydroxy.

T in the significance of a non-reactive radical is preferably $C_1-C_4$alkoxy, $C_1-C_4$alkylthio, hydroxy, amino, N-$C_1-C_4$alkylamino which is unsubstituted or substituted in the alkyl moiety by hydroxy, sulfato or sulfo; morpholino, phenylamino or N-$C_1-C_4$alkyl-N-phenylamino in which phenyl is unsubstituted or substituted by sulfo, carboxy, acetylamino, methyl or methoxy.

Particularly preferred non-reactive radicals T are amino, N-methylamino, N-ethylamino, morpholino, phenylamino, 2-, 3- or 4-sulfophenylamino or N-$C_1-C_4$alkyl-N-phenylamino.

X is preferably halogen, typically fluoro, chloro or bromo. Chloro or fluoro are particularly preferred.

$X_2$ is preferably bromo.

alk and alk' are each independently of the other typically a methylene, ethylene, 1,3-propylene, 1,4-butylene, 1,5-pentylene or 1,6-hexylene radical or the branched isomers thereof.

alk and alk' are preferably each independently of the other a $C_1-C_4$alkylene radical and, most preferably, an ethylene or propylene radical.

arylene is preferably a 1,3- or 1,4-phenylene radical which is each unsubstituted or substituted e.g. by sulfo, methyl, methoxy or carboxy. arylene is particularly preferably an unsubstituted 1,3- or 1,4-phenylene radical.

$R_1$ and $R_1'$ are each independently of the other preferably hydrogen, methyl or ethyl. Hydrogen is particularly preferred.

$R_3$ is preferably hydrogen.

Q is preferably —NH— or —O—. —O— is particularly preferred.

W is preferably a group of formula —CONH— or —NHCO—, more particularly a group of formula —CONH—.

m is preferably 0.

Preferred reactive radicals of formulae (3a) to (3f) are those wherein W is a group of formula —CONH—; $R_1$, $R_2$ and $R_3$ are each hydrogen, Q is —O— or —NH—; alk and alk' are each independently of the other ethylene or propylene; arylene is phenylene which is each unsubstituted or substituted by methyl, methoxy, carboxy or sulfo, Y is vinyl or β-sulfatoethyl, $Y_1$ is —CHBr—$CH_2$Br or —CBr=$CH_2$, and m is 0.

A reactive radical in $K_1$ or $K_2$ is preferably a radical of the above formula (2a), (2b) or (2c), wherein $R_2$ is hydrogen, n is 2 or 3, X is halogen, T is $C_1$–$C_4$alkoxy, $C_1$–$C_4$alkylthio, hydroxy, amino; N-$C_1$–$C_4$alkylamino which is unsubstituted or substituted in the alkyl moiety by hydroxy, sulfato or sulfo; morpholino, phenylamino or N-$C_1$–$C_4$alkyl-N-phenylamino, wherein alkyl is unsubstituted or substituted by hydroxy, sulfo or sulfato and phenyl is unsubstituted or substituted by sulfo, carboxy, acetylamino, methyl or methoxy, or a fibre-reactive radical of formula

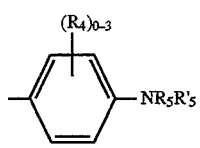

(3c')

or

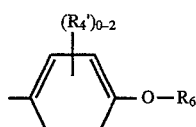

(3d)

and Y is vinyl or β-sulfatoethyl.

It is particularly preferred that $K_1$ and $K_2$ each independently of the other carry a radical of the above formula (2b) or, preferably, formula (2a), wherein the variables each have the meanings and preferred meanings given above.

$K_1$ and $K_2$ are each independently of the other typically a radical of formula

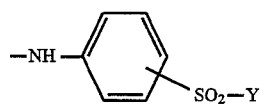

(4a)

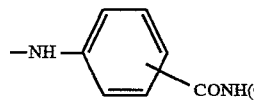

(4b)

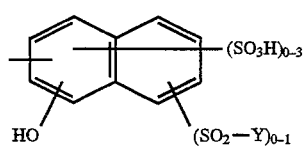

(4c)

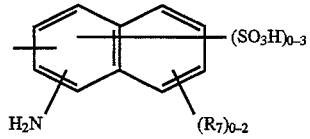

(4d)

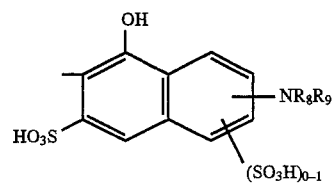

(4e)

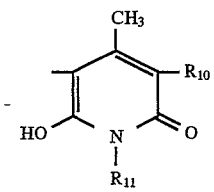

(4f)

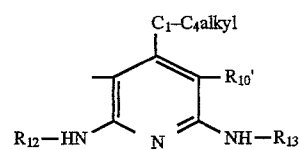

(4g)

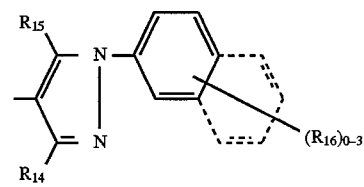

(4h)

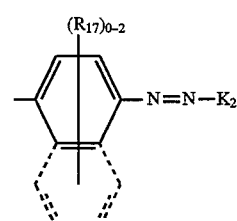

(4i)

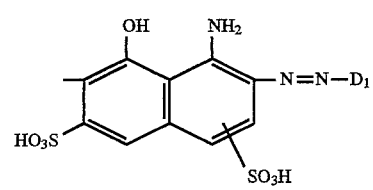

(4j)

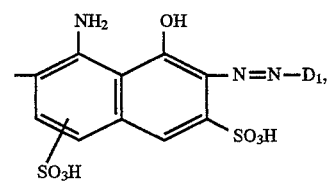

(4k)

or

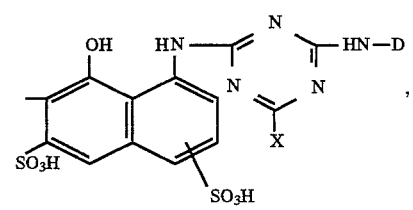

(4l)

wherein $(R_4)_{0-3}$ is 0 to 3 identical or different radicals $R_4$ typically selected from the group consisting of $C_1$–$C_4$alkyl, $C_1$–$C_4$alkoxy; $C_1$–$C_4$-alkoxy which is substituted by hydroxy, $C_1$–$C_4$alkoxy or sulfato, halogen, carboxy, hydroxy, amino, N-mono- or N,N-di-$C_1$–$C_2$-alkylamino, $C_2$–$C_4$alkanoylamino, ureido, sulfo, $C_1$–$C_4$alkylsulfonyloxy, $C_1$–$C_4$alkylsulfonylamino and a reactive radical of the above formula (2c);

$(R_4')_{0-2}$ is 0 to 2 identical or different radicals $R_4'$ selected from the group consisting of $C_1$–$C_4$alkyl, $C_1$–$C_4$alkoxy, phenoxy, halogen, sulfo and hydroxy;

$R_5$ is hydrogen or $C_1$–$C_4$alkyl;

$R_5'$ independently has the meaning of $R_5$, or is $C_2$–$C_4$alkanoyl, $C_1$–$C_4$hydroxyalkyl, $C_1$–$C_4$sulfatoalkyl, $C_1$–$C_4$alkoxyalkyl, or phenyl which is unsubstituted or substituted by methyl, methoxy, chloro or sulfo;

$R_6$ ia hydrogen, $C_1$–$C_4$alkyl or phenyl;

$(R_7)_{0-2}$ is 0 to 2 identical or different substituents selected from the group consisting of hydroxyl and a fibre-reactive radical of the above formula (2a);

$R_8$ is hydrogen or $C_1$–$C_4$-alkyl which is unsubstituted or substituted by hydroxy, $C_1$–$C_4$alkoxy, sulfato, sulfo, halogen or cyano;

$R_9$ independently has the meaning of $R_8$, or is $C_2$–$C_4$alkanoyl or benzoyl, or wherein —$NR_8R_9$ is a fibre-reactive radical of the above formula (2c);

$R_{10}$ and $R_{10}'$ are each independently of the other carbamoyl, sulfomethyl or cyano;

$R_{11}$ is hydrogen or $C_1$–$C_4$alkyl which is unsubstituted or substituted by a radical of the above formula (2c);

$R_{12}$ and $R_{13}$ are each independently of the other hydrogen or $C_1$–$C_{12}$alkyl which is unsubstituted or substituted by hydroxy, $C_1$–$C_4$alkoxy, phenoxy, sulfato, sulfo, carboxy, amino, or N-mono- or N,N-di-$C_1$–$C_4$alkylamino which may each in turn be substituted in the alkyl moiety by hydroxy, $C_1$–$C_4$alkoxy, phenoxy, sulfato, sulfo, carboxy or a fibre-reactive radical of the above formula (2c), and/or which may be interrupted, with the exception of methyl, by —O—;

$R_{14}$ is methyl or carboxy;

$R_{15}$ is hydroxy or amino;

$(R_{16})_{0-3}$ is 0 to 3 identical or different radicals $R_{16}$ selected from the group consisting of sulfo, halogen, hydroxy, $C_1$–$C_4$alkoxy and $C_1$–$C_4$alkyl;

$(R_{17})_{0-2}$ is 0 to 2 identical or different radicals $R_{17}$ selected from the group consisting of $C_1$–$C_4$alkyl, $C_1$–$C_4$alkoxy, $C_1$–$C_4$alkoxy which is substituted by hydroxy, $C_1$–$C_4$alkoxy or sulfato, $C_2$–$C_4$alkanoylamino, ureido, halogen and sulfo;

$K_2$ is independently a radical of the above formula (4a)–(4h) or (4j)–(4l) and, preferably, a radical of formula (4e);

$D_1$ is a phenyl or 1- or 2-naphthyl radical carrying 1 to 3 identical or different radicals selected from the group consisting of sulfo, $C_1$–$C_4$alkyl, $C_1$–$C_4$alkoxy, halogen and a fibre-reactive radical of formula (2a) or (2b);

D is the radical of a monoazo or disazo chromophore;

and X and Y each have the meaning given above.

The variables indicated in formulae (4a) to (4l) have the following preferred meanings:

$(R_4)_{0-3}$ is preferably 0 to 3 identical or different radicals $R_4$ selected from the group consisting of methyl, methoxy, ethoxy which is substituted in the alkyl moiety by hydroxy, methoxy, ethoxy or sulfato; chloro, hydroxy, amino, N-mono- or N,N-di-$C_1$–$C_2$-alkylamino, acetylamino, propionylamino, sulfo, and a reactive radical of the above formula (2c), wherein X is halogen, $R_i'$ is hydrogen, and T is amino or morpholino which is unsubsfituted or substituted by non-reactive radicals;

$(R_4')_{0-2}$ is preferably 0 to 2 identical or different radicals $R_4'$ selected from the group consisting of methyl, methoxy, phenoxy, chloro, sulfo and hydroxy;

$R_5$ is hydrogen, methyl or ethyl;

$R_5'$ independently has the meaning of $R_5$, or is acetyl, propionyl, 2-hydroxyethyl or 2-sulfatoethyl;

$R_6$ is preferably hydrogen;

$R_8$ is preferably hydrogen, and $R_9$ is preferably acetyl, propionyl or benzoyl, or —$NR_8R_9$ is a fibre-reactive radical of the above formula (2c);

$R_{10}$ is preferably carbamoyl or sulfomethyl;

$R_{10}'$ is preferably cyano or carbamoyl;

$R_{11}$ is preferably methyl or ethyl;

$R_{12}$ is preferably hydrogen or $C_1$–$C_6$alkyl which is unsubstituted or substituted by hydroxy, methoxy, ethoxy, sulfato or sulfo;

$R_{13}$ has independently preferably the meaning of $R_{12}$, or is a radical of the above formula (2c);

$R_{15}$ is preferably hydroxy;

$R_{12}$ and $R_{13}$ are each independently of the other preferably hydrogen, or $C_1$–$C_6$-alkyl which is unsubstituted or substituted by hydroxy, sulfo or sulfato;

$(R_{16})_{0-3}$ is preferably 0 to 3 identical or different radicals $R_{16}$ selected from the group consisting of sulfo, methyl, methoxy, hydroxy and chloro;

$(R_{17})_{0-2}$ is preferably 0 to 2 identical or different radical $R_{17}$ selected from the group consisting of methyl, methoxy, $C_1$–$C_2$alkoxy which is substituted by hydroxy or sulfato; acetylamino, propionylamino and sulfo;

$D_1$ is preferably a phenyl or 1- or 2-naphthyl radical carrying 1 to 3 identical or different radicals selected from the group consisting of sulfo, methyl, methoxy, chloro and a fibre-reactive radical of formula (2a) or (2b); and D is preferably the radical of a monoazo or disazo chromophore, containing diazo components and coupling components of the benzene or naphthalene series which is substituted by one or more than one substituent selected from the group consisting of sulfo, methyl, methoxy, chloro, amino, hydroxy, acetylamino, propionylamino, benzoylamino, ureido, 2-hydroxyethoxy, 2-sulfatoethoxy and a fibre-reactive radical of formula (2c). D in formula (41) is most preferably a radical of formula $$-D^*-N=N-K^*(-N=N-D_1^*)_{0-1} \quad (5a)$$

or $$-K^*-N=N-(M-N=N-)_{0-1}D^* \quad (5b),$$

wherein D* is an unsubstituted or sulfo-substituted phenylene radical, $D_1^*$ is phenyl or naphthyl which are each unsubstituted or substituted by sulfo or a radical of the above formula (2a), K* is the radical of a coupling component of the aminonaphtholsulfonic acid series, typically the radical of H-, K-, I- or γ-acid which is unsubstituted or substituted at the amino group by acetyl, propionyl, benzoyl or a fibre-reactive radical of the above formula (2c), and M is phenylene which is unsubstituted or substituted by sulfo, methyl, methoxy, acetylamino, ureido, 2-hydroxyethoxy or 2-sulfatoethoxy.

$K_1$ and $K_2$ are each independently of the other preferably a radical of formula

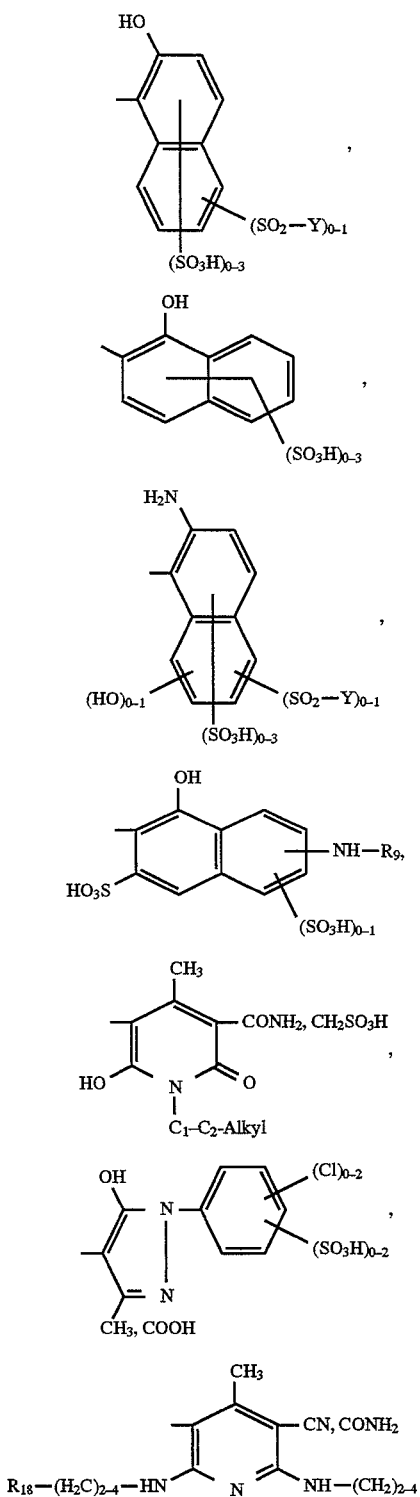

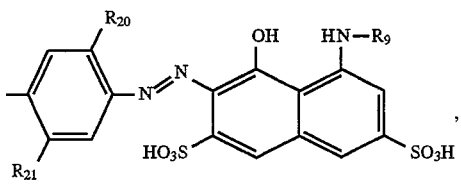

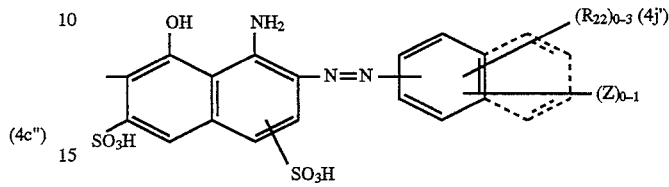

or

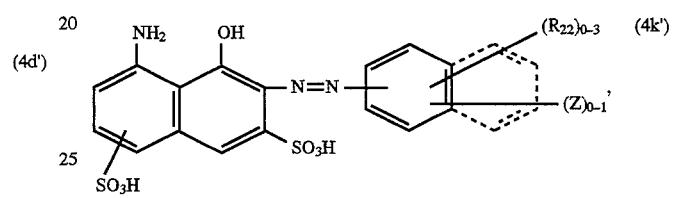

wherein $R_9$ is acetyl, benzoyl or a radical of formula

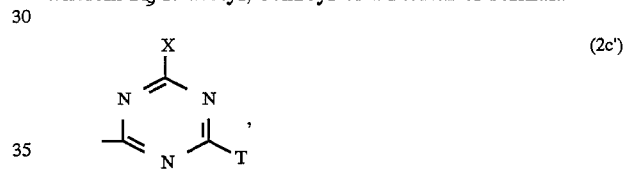

wherein X and T have the above meanings and preferred meanings, $R_{18}$ is hydrogen, hydroxy or sulfato, $R_{19}$ independently has the meaning of $R_{18}$, or is a radical of the above formula (2c), $R_{20}$ and $R_{21}$ are each independently of the other hydrogen, methyl, methoxy, 2-hydroxyethoxy, 2-sulfatoethoxy, acetylamino, propionylamino, ureido or sulfo, $(R_{22})_{0-3}$ is 0 to 3 identical or different radicals $R_{22}$ selected from the group consisting of sulfo, chloro, $C_1$–$C_4$alkyl or $C_1$–$C_4$alkoxy, Z is a radical of the above formula (2a) or (2b), and Y has the meanings and preferred meanings given above.

$K_1$ and $K_2$ are each independently of the other most preferably a radical of the above formula (4j') or (4k').

$K_1$ and $K_2$ may be different or, preferably, identical.

A preferred embodiment of this invention relates to compounds of formula

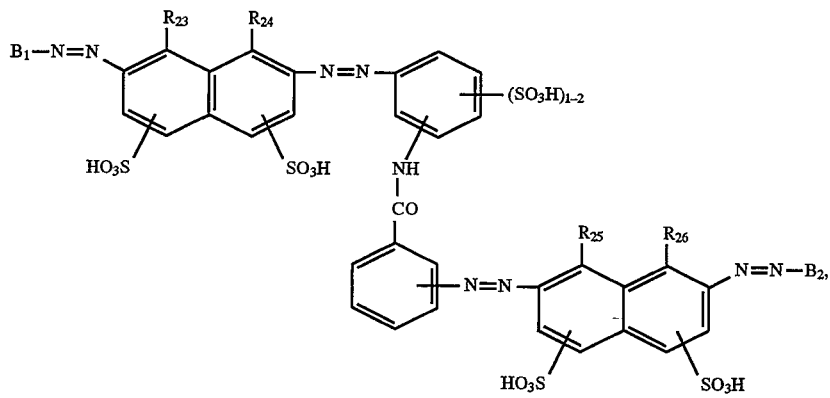

(1a)

wherein $B_1$ is a radical of formula

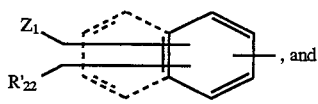, and $B_2$ is a radical of formula

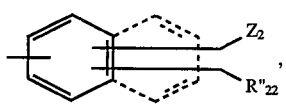, $R'_{22}$ and $R''_{22}$ are each independently of the other hydrogen, sulfo, chloro, $C_1$-$C_4$alkyl or $C_1$-$C_4$alkoxy; one of $R_{23}$ and $R_{24}$ is hydroxy and the other is amino; one of $R_{25}$ and $R_{26}$ is hydroxy and the other is amino, and $Z_1$ and $Z_2$ are each independently of the other a radical of the above formula (2a) or (2b).

A particularly preferred embodiment of this invention relates to compounds of formula

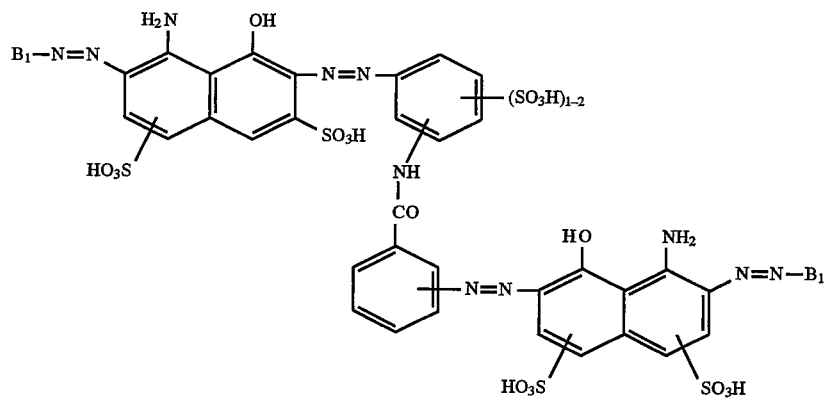

(1b)

or

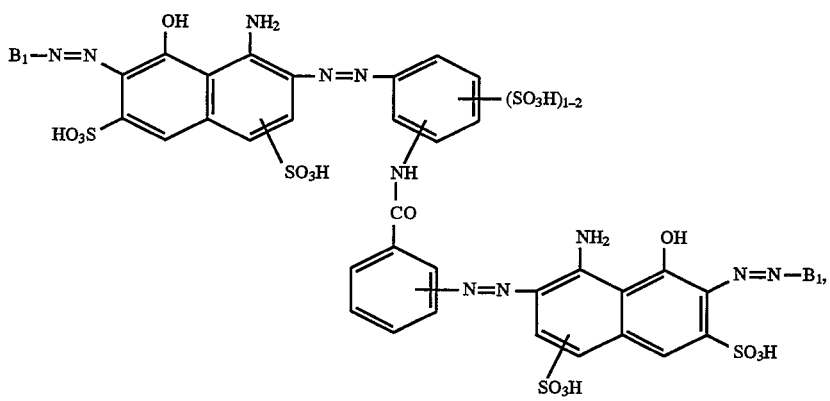

(1c)

wherein $B_1$ is a radical of formula

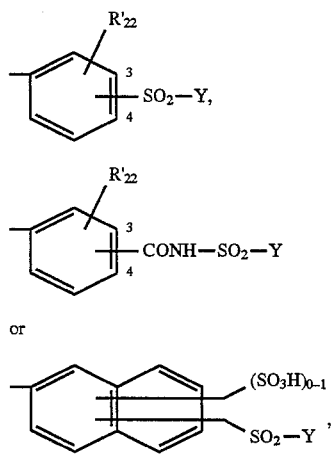

$R'_{22}$ is hydrogen, sulfo, methyl or methoxy, and Y has the meanings and preferred meanings given above.

The compounds of formula (1') can be obtained by e.g. tetrazotising about 1 molar equivalent of the compound of formula

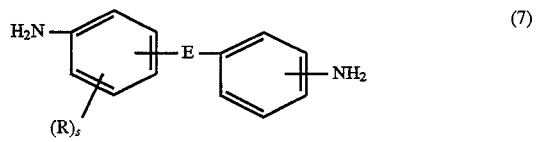

in conventional manner, typically with nitrite such as sodium nitrite in acid medium, typically a medium containing hydrochloric acid, and then coupling the tetrazotised compound with about 1 molar equivalent of a coupling component of formula $$K_1—H \qquad (8)$$

and about 1 molar equivalent of a coupling component of formula $$K_2—H \qquad (9)$$

in acid, neutral or alkaline medium, E, R, $K_1$, $K_2$ and s having the meanings and preferred meanings given above.

If $K_1$—H and $K_2$—H are identical coupling components then it is advantageous to react about 1 molar equivalent of the tetrazotised compound of formula (7) with about 2 molar equivalents of a compound of formula (8).

The synthesis of the compounds of formula (1') can also be carried out by first coupling the tetrazotised compound of formula (7) with a precursor of $K_1$—H or $K_2$—H and then converting the resultant disazo compound into the final compound, typically by coupling with a further diazotised diazo component.

The preferred compounds of formula (1b) and (1c) are conveniently prepared by coupling about 1 molar equivalent of a diazotised compound of formula

wherein $B_1$ has the meaning given above, with about 1 molar equivalent of a coupling component of formula

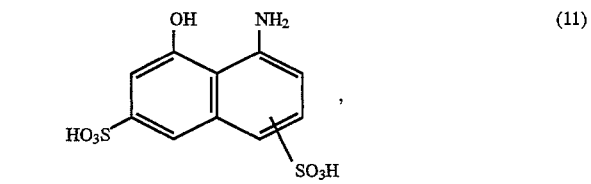

and coupling the monoazo compound so obtained with about 0.5 molar equivalent of a tetrazotised compound of formula

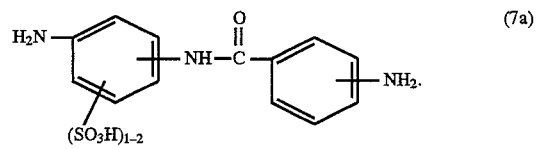

The first coupling is carried out in acid medium to prepare the compounds of formula (1b), and in alkaline medium to prepare the compounds of formula (1c). This process, in which the pH in the first coupling is in the acid range, is particularly preferred for the preparation of the compounds of formula (1b).

The compounds of formula (1b) and (1c) can also be prepared by coupling about 0.5 molar equivalent of a previously tetrazotised compound of formula (7a) with about 1 molar equivalent of a compound of the above formula (11) and then coupling the disazo compound so obtained with a diazotised compound of the above formula (10). It is particularly preferred to use this process, in which the pH in the first coupling is in the acid range, for the preparation of the compounds of formula (1c).

Replacing 1 molar equivalent of a compound of formula (11) in the above process for the preparation of the compounds of formulae (1b) and (1c) with c. 0.5 molar equivalent of each of two different compounds of formula (11), typically c. 0.5 molar equivalent of an aminonaphtholdisulfonic acid KK1 and c. 0.5 molar equivalent of an aminionaphtholdisulfonic acid KK2, gives mixtures of two symmetrical and two asymmetrical compounds, e.g. of formula

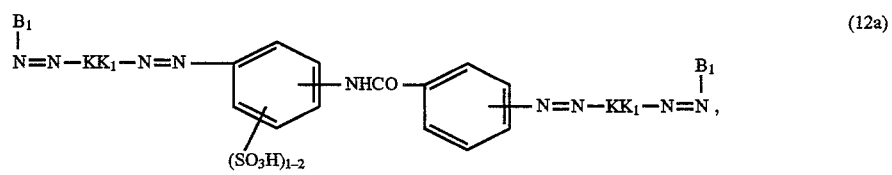

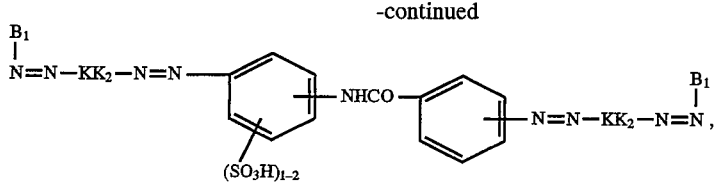

(12b)

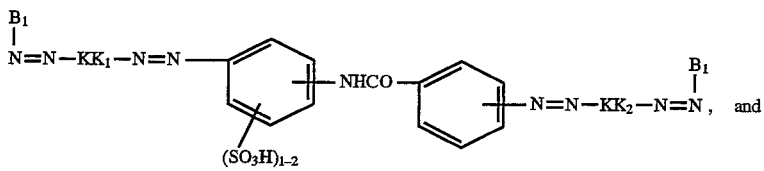

(12c)

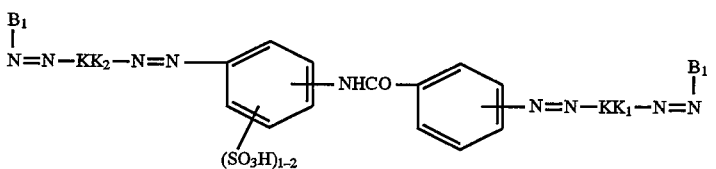

(12d)

which constitute a further object of this invention. The variable $B_1$ in formulae (12a) to (12d) has the meanings and preferred meanings given above, and KK1 is preferably the radical of 1-amino-8-hydroxynaphthalene-3,6-disulfonic acid (H-acid), and KK2 is preferably the radical of 1-amino-8-hydroxynaphthalene-4,6-disulfonic acid (K-acid).

The compounds of formula (7) or (7a), (8), (9), (10) and (11) are known or can be prepared in per se known manner. Accordingly, the compounds of formula (7) may conveniently be prepared by simple reaction in conventional manner of an aminobenzoyl chloride or an aminobenzenesulfoyl chloride with the corresponding diaminobenzene or aminobenzenesulfonamide.

The novel compounds of formula (1') as well as the mixtures of compounds of formulae (12a) to (12d) are fibre-reactive, i.e. they are capable of reacting with the hydroxyl groups of cellulose or with the reactive centres of natural and synthetic polyamides to form covalent chemical bonds.

The reactive dyes of formula(1') as well as of the mixtures of compounds of formula (12a) to (12d) are suitable for dyeing and printing a wide range of materials, preferably hydroxyl group-containing or nitrogen-containing fibre materials. Illustrative examples of such materials are silk, leather, wool, polyamide fibres and polyurethanes, and, in particular, cellulosic fibre materials of all kinds. Typical examples of such materials are natural cellulose fibres such as cotton, linen and hemp, as well as cellulose and regenerated cellulose. The reactive dyes of formula (1) are also suitable for dyeing or printing hydroxyl group-containing fibres which are components of blended fabrics, typically blends of cotton and polyester or polyamide fibres.

The novel dyes can be applied to, and fixed on, the fibre material by different methods, preferably in the form of aqueous dye solutions and printing pastes. They are suitable for dyeing by the exhaust process as well as by the pad dyeing process, and they can be used at low dyeing temperatures and require only short steaming times in the pad-steam process. Fixation is good and unfixed dye can be easily washed off, the difference between degree of exhaustion and degree of fixation being remarkably small, i.e. the soap loss is very insignificant. The reactive dyes of formula (1') and (12a) to (12d) are also suitable for printing, especially on cotton, but also for printing nitrogen-containing fibres such as wool, silk or blends which contain wool.

The dyeings and prints obtained with the dyes of this invention have superior tinctorial strength and high fibre-dye bonding stability in the acid as well as in the alkaline range. In addition, they have good lighffastness and very good wetfastness properties such as fastness to washing, water, seawater, cross-dyeing and perspiration, as well as good fastness to pleating, ironing, rubbing and, in particular, chlorine.

The invention is illustrated by the following Examples in which, unless otherwise stated, parts and percentages are by weight. The ratio of parts by weight to parts by volume is the same as that of the kilogram to the liter.

Preparation of the diazotised amines of formula (10)

EXAMPLE 1

28 parts of the amine of formula $A_1$—$NH_2$, wherein $A_1$ is the radical of formula

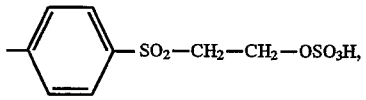

are thoroughly stirred in 150 parts of water. 16 parts of concentrated hydrochloric acid are added to the suspension so obtained. After cooling to 0°–5° C., 7 parts of sodium nitrite, dissolved in 25 parts of water, are slowly added dropwise. When the reaction of the amine to the corresponding diazo compound is complete, excess nitrite is destroyed by addition of sulfamic acid.

EXAMPLES 2–4

In general accordance with the procedure of Example 1, the diazo compounds of the following amines can be prepared:

| Example | Amine |
|---|---|
| 2 | $A_2-NH_2$ 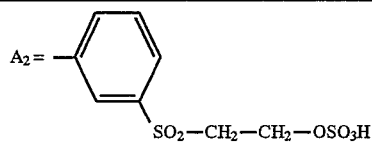 |
| 3 | $A_3-NH_2$ 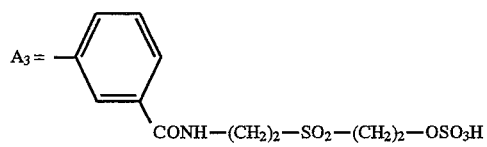 |
| 4 | $A_4-NH_2$ 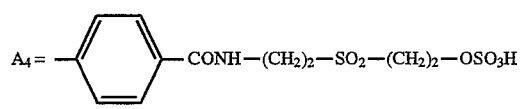 |

Preparation of the tetrazotised compounds of formula (7) or (7a)

EXAMPLE 5

19 parts of the diamine of formula $H_2N-E_1-NH_2$, wherein $E_1$ is the radical of formula

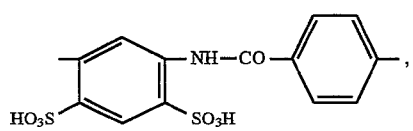

are dissolved in 190 parts of water to form a neutral solution. After cooling to c. 0° C., 16 parts of concentrated hydrochloric acid are added to this solution, and then a solution of 7 parts of sodium nitrite in 25 parts of water is slowly added dropwise. When the reaction of the diamine to the corresponding tetrazo compound is complete, excess nitrite is destroyed by addition of sulfamic acid.

EXAMPLES 6–10

In general accordance with the procedure of Example 5, the tetrazo compounds of the following diamines can be prepared:

| Example | Diamine | |
|---|---|---|
| 6 | $H_2N-E_2-NH_2$ | $E_2=$ 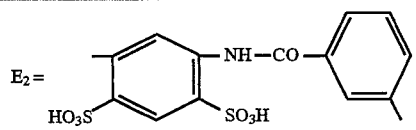 |
| 7 | $H_2N-E_3-NH_2$ | $E_3=$ 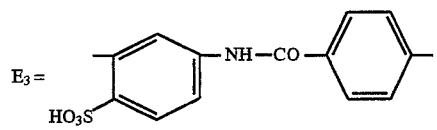 |
| 8 | $H_2N-E_4-NH_2$ | $E_4=$ 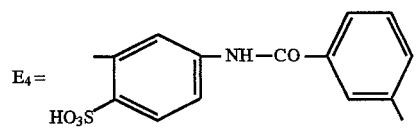 |
| 9 | $H_2N-E_5-NH_2$ | $E_5=$ 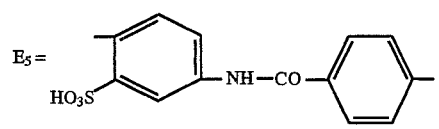 |
| 10 | $H_2N-E_6-NH_2$ | $E_6=$ 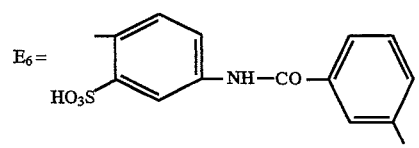 |

-continued

| Example | Diamine | |
|---|---|---|
| 10a | H$_2$N—E$_7$—NH$_2$ | 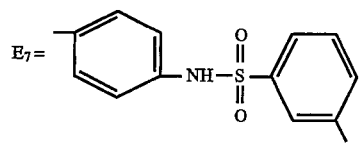 |
| 10b | H$_2$N—E$_8$—NH$_2$ | 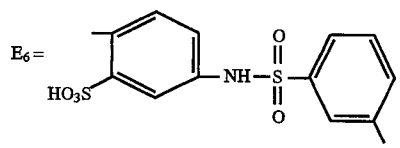 |
| 10c | H$_2$N—E$_9$—NH$_2$ | 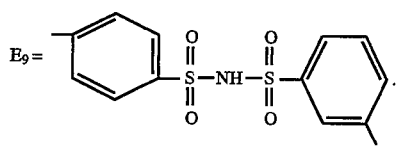 |

Preparation of the compounds of formula (1)

EXAMPLE 11

The solution of the diazo compound of the amine of formula A$_1$—NH$_2$ obtained according to Example 1 is added dropwise to a suspension of 32 parts of 1-amino-8-hydroxynaphthalene-3,6-disulfonic acid (H-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the tetrazo compound of the amine of formula H$_2$N—E$_1$—NH$_2$ obtained according to Example 5 is slowly added dropwise, while keeping the pH constant at 3–4 by addition of sodium hydroxide solution. When coupling is complete, the dye solution is freed from salt by dialysis and concentrated by evaporation under vacuum, affording the compound of formula in the form of the free acid as a dark powder, which dyes cellulose in a navy blue shade of good allround fastness properties.

EXAMPLES 11a–11c

The procedure of Example 11 is repeated, but replacing the solution of the tetrazo compound of the amine of formula H$_2$N—E$_1$—NH$_2$ with an equivalent amount of the solution of the tetrazo compound according to Example 10a, 10b or 10c, to give the following compounds which also dye cellulose in a navy blue shade of good allround fastness properties.

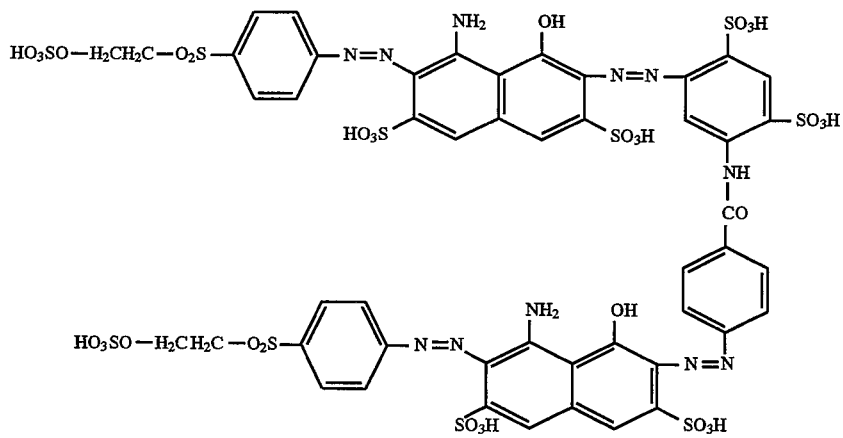

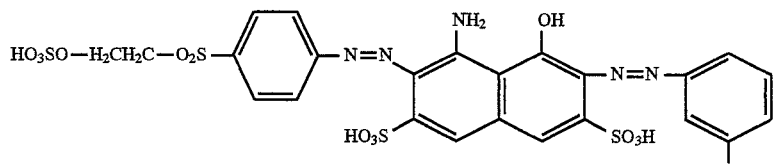
11a
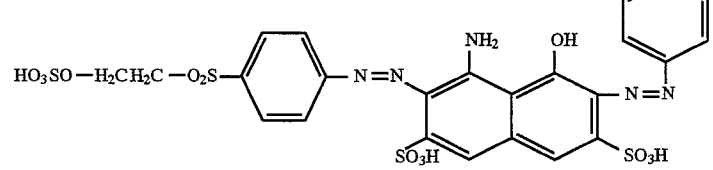
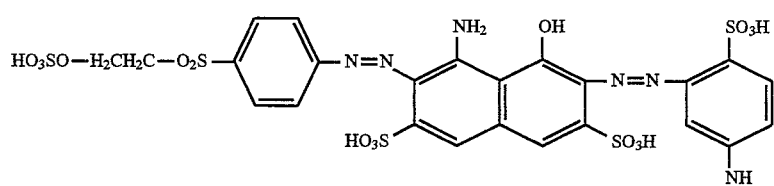
11b
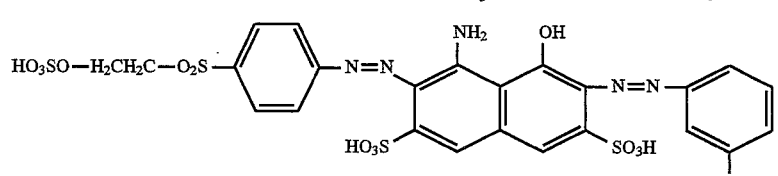
11c
EXAMPLE 12–34
In general accordance with the procedure of Example 11, the dyes of the general formula
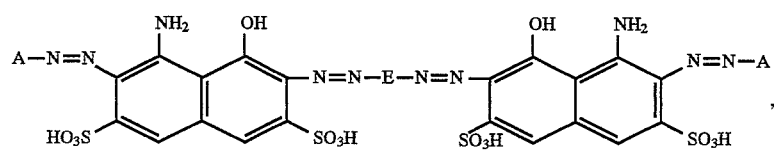

wherein the variables have the meanings indicated in Table 1, can be obtained from the diazo compounds of Examples 1 to 4 and the tetrazo compounds of Examples 5 to 10. These dyes also dye cellulose in a navy blue shade of good allround fastness properties.

TABLE 1

| Example No. | A | E |
|---|---|---|
| 12 | $A_1$ | $E_2$ |
| 13 | $A_1$ | $E_3$ |
| 14 | $A_1$ | $E_4$ |
| 15 | $A_1$ | $E_5$ |
| 16 | $A_1$ | $E_6$ |
| 17 | $A_2$ | $E_1$ |
| 18 | $A_2$ | $E_2$ |
| 19 | $A_2$ | $E_3$ |
| 20 | $A_2$ | $E_4$ |
| 21 | $A_2$ | $E_5$ |
| 22 | $A_2$ | $E_6$ |
| 23 | $A_3$ | $E_1$ |
| 24 | $A_3$ | $E_2$ |
| 25 | $A_3$ | $E_3$ |
| 26 | $A_3$ | $E_4$ |
| 27 | $A_3$ | $E_5$ |
| 28 | $A_3$ | $E_6$ |
| 29 | $A_4$ | $E_1$ |
| 30 | $A_4$ | $E_2$ |
| 31 | $A_4$ | $E_3$ |
| 32 | $A_4$ | $E_4$ |

TABLE 1-continued

| Example No. | A | E |
|---|---|---|
| 33 | $A_4$ | $E_5$ |
| 34 | $A_4$ | $E_6$ |

$A_1$–$A_4$ and $E_1$–$E_6$ in this Table have the meaning given in the Examples 1 to 10.

EXAMPLE 35

The solution of the tetrazo compound of the amine of formula $H_2N$—$E_1$—$NH_2$ obtained according to Example 5 is added dropwise to a suspension of 32 parts of 1-amino-8-hydroxynaphthalene-3,6-disulfonic acid (H-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the diazo compound of the amine of formula $A_1$—$NH_2$ obtained according to Example 1 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

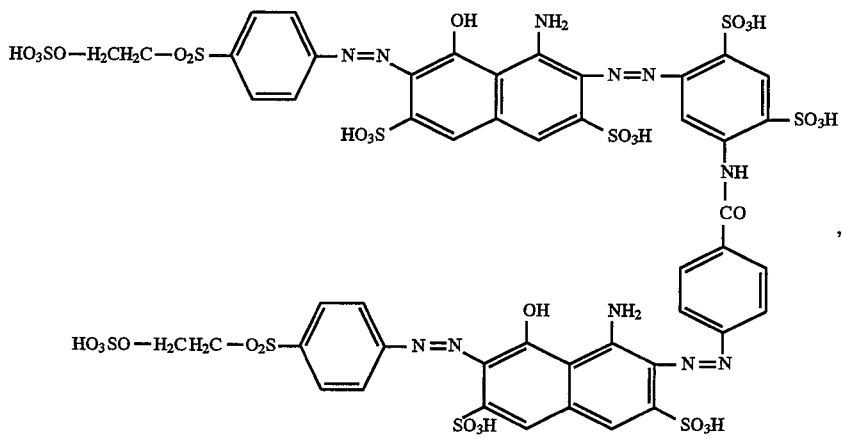

in the form of the free acid as a dark powder, which dyes cellulose in a navy blue shade of good allround fastness properties.

EXAMPLES 36–58

In general accordance with the procedure of Example 35, the dyes of the general formula

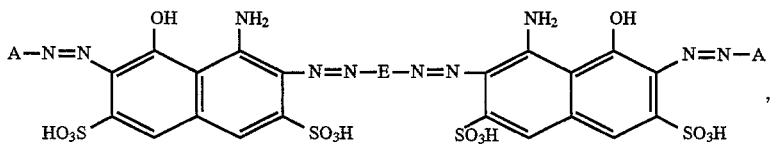

wherein the variables have the meaning indicated in Table 2, can be obtained from the diazo compounds of Examples 1 to 4 and the tetrazo compounds of Examples 5 to 10. These dyes also dye cellulose in a navy blue shade of good allround fastness properties.

TABLE 2

| Example No. | A | E |
|---|---|---|
| 36 | $A_1$ | $E_2$ |
| 37 | $A_1$ | $E_3$ |
| 38 | $A_1$ | $E_4$ |
| 39 | $A_1$ | $E_5$ |
| 40 | $A_1$ | $E_6$ |
| 41 | $A_2$ | $E_1$ |
| 42 | $A_2$ | $E_2$ |
| 43 | $A_2$ | $E_3$ |
| 44 | $A_2$ | $E_4$ |
| 45 | $A_2$ | $E_5$ |
| 46 | $A_2$ | $E_6$ |
| 47 | $A_3$ | $E_1$ |
| 48 | $A_3$ | $E_2$ |
| 49 | $A_3$ | $E_3$ |
| 50 | $A_3$ | $E_4$ |
| 51 | $A_3$ | $E_5$ |
| 52 | $A_3$ | $E_6$ |
| 53 | $A_4$ | $E_1$ |
| 54 | $A_4$ | $E_2$ |
| 55 | $A_4$ | $E_3$ |
| 56 | $A_4$ | $E_4$ |//

TABLE 2-continued

| Example No. | A | E |
|---|---|---|
| 57 | $A_4$ | $E_5$ |
| 58 | $A_4$ | $E_6$ |

$A_1$–$A_4$ and $E_1$–$E_6$ in Table 2 have the meanings given in the Examples 1 to 10.

EXAMPLE 59

The solution of the diazo compound of the amine of formula $A_1$—$NH_2$ obtained according to Example 1 is added dropwise to a suspension of 32 parts of 1-amino-8-hydroxynaphthalene-4,6-disulfonic acid (K-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the tetrazo compound of the amine of formula $H_2N$—$E_1$—$NH_2$ obtained according to Example 5 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

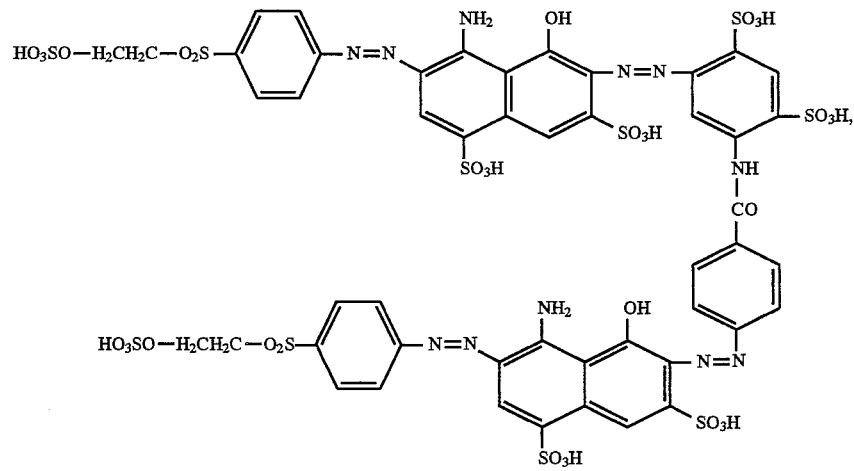

in the form of the free acid as a dark powder, which dyes cellulose in a navy blue shade of good allround fastness properties.

EXAMPLES 60–82

In general accordance with the procedure of Example 59, the dyes of the general formula

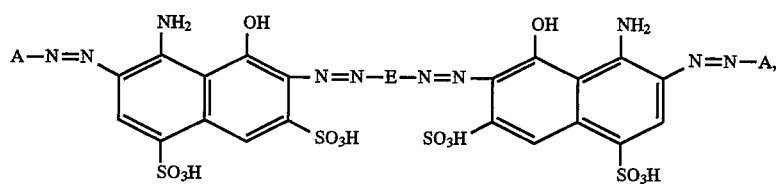

wherein the variables have the meaning indicated in Table 3, can be obtained from the diazo compounds of Examples 1 to 4 and the tetrazo compounds of Examples 5 to 10. These dyes also dye cellulose in a navy blue shade of good allround fastness properties.

TABLE 3

| Example No. | A | E |
|---|---|---|
| 60 | $A_1$ | $E_2$ |
| 61 | $A_1$ | $E_3$ |
| 62 | $A_1$ | $E_4$ |
| 63 | $A_1$ | $E_5$ |
| 64 | $A_1$ | $E_6$ |
| 65 | $A_2$ | $E_1$ |
| 66 | $A_2$ | $E_2$ |
| 67 | $A_2$ | $E_3$ |
| 68 | $A_2$ | $E_4$ |
| 69 | $A_2$ | $E_5$ |
| 70 | $A_2$ | $E_6$ |
| 71 | $A_3$ | $E_1$ |
| 72 | $A_3$ | $E_2$ |
| 73 | $A_3$ | $E_3$ |
| 74 | $A_3$ | $E_4$ |
| 75 | $A_3$ | $E_5$ |
| 76 | $A_3$ | $E_6$ |
| 77 | $A_4$ | $E_1$ |
| 78 | $A_4$ | $E_2$ |
| 79 | $A_4$ | $E_3$ |
| 80 | $A_4$ | $E_4$ |
| 81 | $A_4$ | $E_5$ |
| 82 | $A_4$ | $E_6$ |

$A_1$–$A_4$ and $E_1$–$E_6$ in Table 3 have the meaning given in Examples 1 to 10.

EXAMPLE 83

The solution of the tetrazo compound of the amine of formula $H_2N$—$E_1$—$NH_2$ obtained according to Example 5 is added dropwise to a suspension of 32 parts of 1-amino-8-hydroxynaphthalene-4,6-disulfonic acid (K-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the diazo compound of the amine of formula $A_1$—$NH_2$ obtained according to Example 1 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

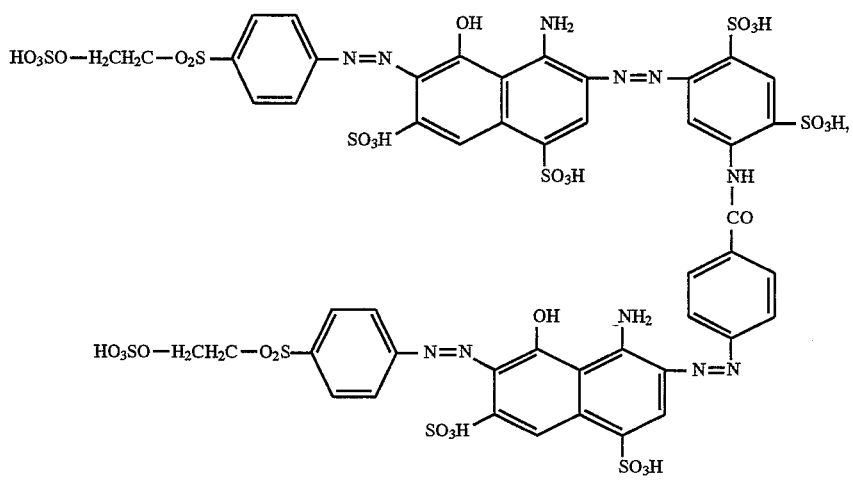

in the form of the free acid as a dark powder, which dyes cellulose is a navy blue shade of good allround fastness properties.

EXAMPLES 84–106

In general accordance with the procedure of Example 83, the dyes of the general formula

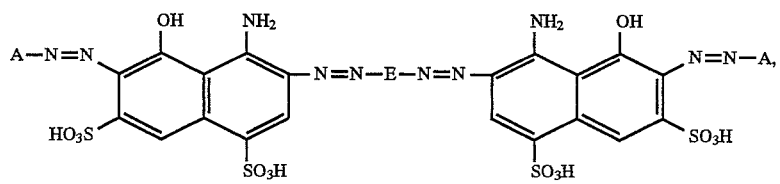

wherein the variables have the meaning indicated in Table 4, can be obtained from the diazo compounds of Examples 1 to 4 and the tetrazo compounds of Examples 5 to 10. These dyes also dye cellulose in a navy blue shade of good allround fastness properties.

TABLE 4

| Example No. | A | E |
|---|---|---|
| 84 | $A_1$ | $E_2$ |
| 85 | $A_1$ | $E_3$ |
| 86 | $A_1$ | $E_4$ |
| 87 | $A_1$ | $E_5$ |
| 88 | $A_1$ | $E_6$ |
| 89 | $A_2$ | $E_1$ |
| 90 | $A_2$ | $E_2$ |
| 91 | $A_2$ | $E_3$ |
| 92 | $A_2$ | $E_4$ |
| 93 | $A_2$ | $E_5$ |
| 94 | $A_2$ | $E_6$ |
| 95 | $A_3$ | $E_1$ |
| 96 | $A_3$ | $E_2$ |
| 97 | $A_3$ | $E_3$ |
| 98 | $A_3$ | $E_4$ |
| 99 | $A_3$ | $E_5$ |
| 100 | $A_3$ | $E_6$ |
| 101 | $A_4$ | $E_1$ |
| 102 | $A_4$ | $E_2$ |
| 103 | $A_4$ | $E_3$ |
| 104 | $A_4$ | $E_4$ |

TABLE 4-continued

| Example No. | A | E |
|---|---|---|
| 105 | $A_4$ | $E_5$ |
| 106 | $A_4$ | $E_6$ |

$A_1$–$A_4$ and $E_1$–$E_6$ in Table 4 have the meaning given in the Examples 1 to 10.

EXAMPLE 107

35 parts of the amine of formula $A_5$—$NH_2$, wherein $A_5$ is the radical of formula

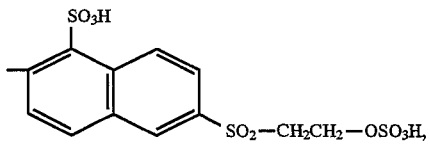

are thoroughly stirred in 200 parts of water. 16 parts of concentrated hydrochloric acid are added to the suspension. After cooling to 0°–5° C., 7 parts of sodium nitrite dissolved in 25 parts of water are slowly added dropwise. When the reaction of the amine to the corresponding diazo compound is complete, excess nitrite is destroyed by addition of sulfamic acid.

EXAMPLES 108–109

In general accordance with the procedure of Example 107, the diazo compounds of the following amines can be prepared:

| Example | Amine | |
|---|---|---|
| 108 | $A_6$—$NH_2$ | $A_6 =$ 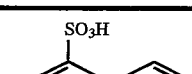 |
| 109 | $A_7$—$NH_2$ | $A_7 =$ 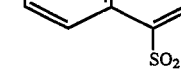 |

EXAMPLE 110

The solution of the tetrazo compound of the amine of formula $H_2N$—$E_1$—$NH_2$ obtained according to Example 5 is added dropwise to a suspension of 32 parts of 1-amino-8-hydroxynaphthalene-3,6-disulfonic acid (H-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the diazo compound of the amine of formula $A_5$—$NH_2$ obtained according to Example 107 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

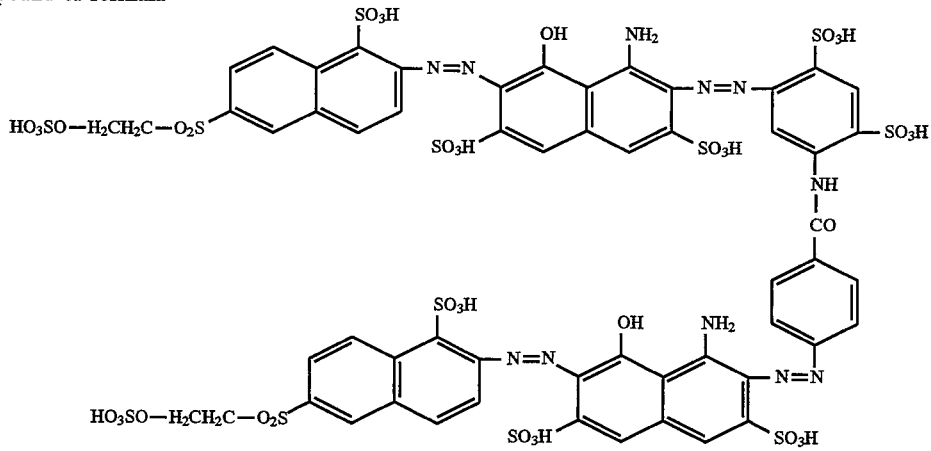

in the form of the free acid as a dark powder, which dyes cellulose in a navy blue shade of good allround fastness properties.

EXAMPLES 111–115

In general accordance with the procedure of Example 110, the dyes of the general formula

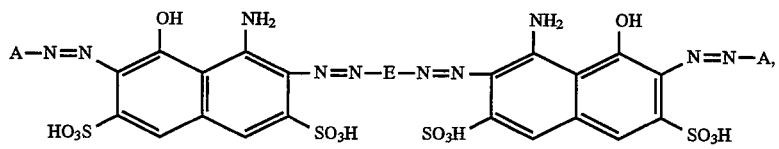

wherein the variables have the meaning indicated in Table 5, can be obtained from the diazo compound of Example 107 and the tetrazo compounds of Examples 6 to 10. These dyes also dye cellulose in a navy blue shade of good allround fastness properties.

TABLE 5

| Example No. | A | E |
|---|---|---|
| 111 | $A_5$ | $E_2$ |
| 112 | $A_5$ | $E_3$ |
| 113 | $A_5$ | $E_4$ |
| 114 | $A_5$ | $E_5$ |
| 115 | $A_5$ | $E_6$ |

$A_5$ and $E_2$–$E_6$ in Table 5 have the meaning given in the Examples 6 to 10 and 107.

EXAMPLES 116–121

The procedure of Examples 110 to 115 is repeated, but replacing the H-acid with the equivalent amount of K-acid, to give the compounds of the general formula

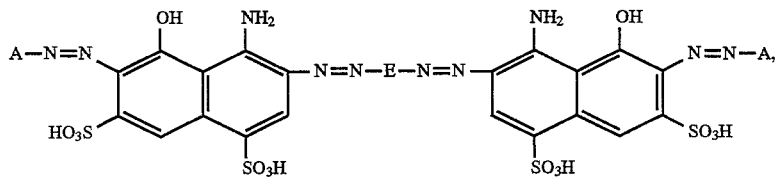

wherein the variables have the meaning indicated in Table 6 and which also dye cellulose in a navy blue shade of good allround fastness properties.

TABLE 6

| Example No. | A | E |
|---|---|---|
| 116 | $A_5$ | $E_1$ |
| 117 | $A_5$ | $E_2$ |
| 118 | $A_5$ | $E_3$ |
| 119 | $A_5$ | $E_4$ |
| 120 | $A_5$ | $E_5$ |
| 121 | $A_5$ | $E_6$ |

$A_5$ and $E_1$–$E_6$ in Table 6 have the meaning given in Examples 5 to 10 and 107.

EXAMPLE 122

The solution of the tetrazo compound of the amine of formula $H_2N$—E1—$NH_2$ obtained according to Example 5 is added dropwise to a suspension of 32 parts of 1-amino-8-hydroxynaphthalene-3,6-disulfonic acid (H-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the diazo compound of the amine of formula $A_6$—$NH_2$ obtained according to Example 108 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

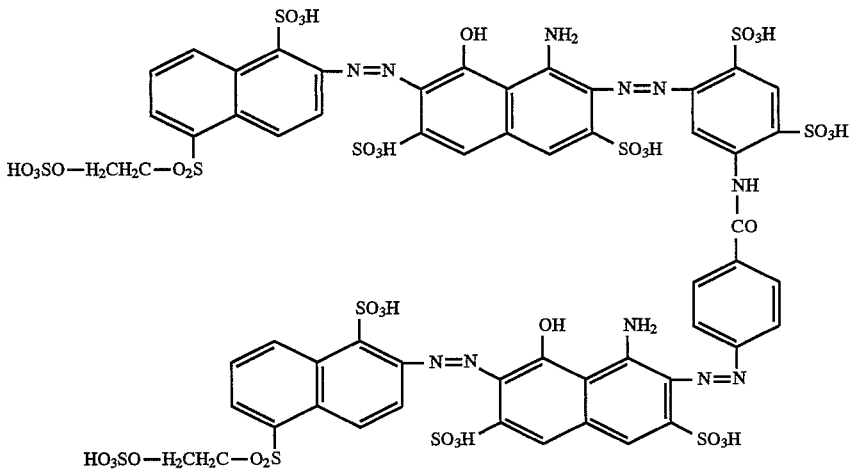

in the form of the free acid as a dark powder, which dyes cellulose in a navy blue shade of good allround fastness properties.

EXAMPLES 123–127

In general accordance with the procedure of Example 122, the dyes of the general formula

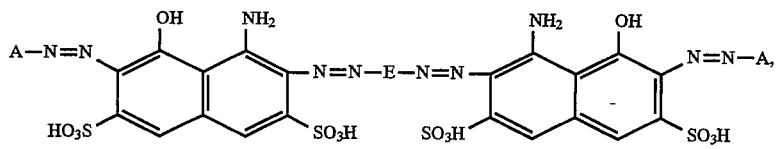

wherein the variables have the meaning indicated in Table 7, can be obtained from the diazo compound of Example 108 and the tetrazo compounds of the Examples 6 to 10. These dyes also dye cellulose in a navy blue shade of good allround fastness properties.

TABLE 7

| Example No. | A | E |
|---|---|---|
| 123 | $A_6$ | $E_2$ |
| 124 | $A_6$ | $E_3$ |
| 125 | $A_6$ | $E_4$ |
| 126 | $A_6$ | $E_5$ |
| 127 | $A_6$ | $E_6$ |

$A_6$ and $E_2$–$E_6$ in Table 7 have the meaning given in Examples 6 to 10 and 108.

EXAMPLES 128–133

The procedure of Examples 122 to 127 is repeated, but replacing the H-acid with the equivalent amount of K-acid, to give the compounds of the general formula

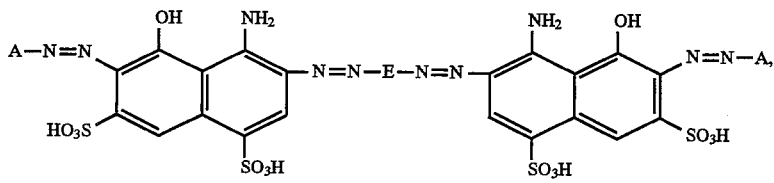

wherein the variables have the meaning indicated in Table 8 and which also dye cellulose in a navy blue shade of good allround fastness properties.

TABLE 8

| Example No. | A | E |
|---|---|---|
| 128 | $A_6$ | $E_1$ |

TABLE 8-continued

| Example No. | A | E |
|---|---|---|
| 129 | $A_6$ | $E_2$ |
| 130 | $A_6$ | $E_3$ |
| 131 | $A_6$ | $E_4$ |
| 132 | $A_6$ | $E_5$ |
| 133 | $A_6$ | $E_6$ |

$A_6$ and $E_1$–$E_6$ in Table 8 have the meaning given in Examples 5 to 10 and 108.

EXAMPLE 134

The solution of the tetrazo compound of the amine of formula $H_2N$—$E_1$—$NH_2$ obtained according to Example 5 is added dropwise to a suspension of 32 parts of 1-amino-8-hydroxynaphthalene-3,6-disulfonic acid (H-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the diazo compound of the amine of formula $A_7$—$NH_2$ obtained according to Example 109 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

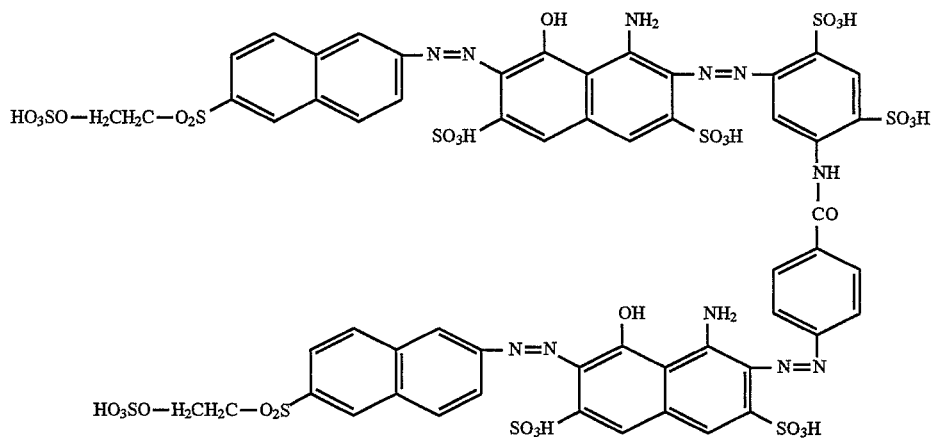

in the form of the free acid as a dark powder, which dyes cellulose in a navy blue shade of good allround fastness properties.

EXAMPLES 135–139

In general accordance with the procedure of Example 134, the dyes of the general formula

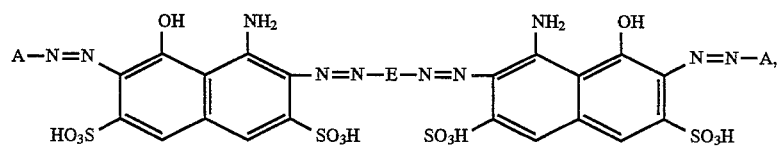

wherein the variables have the meaning indicated in Table 9, can be obtained from the diazo compound of Example 109 and the tetrazo compounds of Examples 6 to 10. These dyes

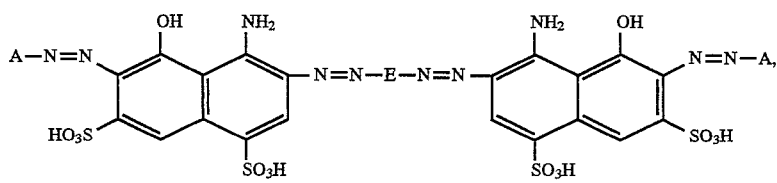

also dye cellulose in a navy blue shade of good allround fastness properties.

TABLE 9

| Example No. | A | E |
|---|---|---|
| 135 | $A_7$ | $E_2$ |
| 136 | $A_7$ | $E_3$ |
| 137 | $A_7$ | $E_4$ |
| 138 | $A_7$ | $E_5$ |
| 139 | $A_7$ | $E_6$ |

$A_7$ and $E_2$–$E_6$ in Table 9 have the meaning given in the Examples 6 to 10 and 109.

EXAMPLES 140–145

The procedure of Examples 134 to 139 is repeated, but replacing the H-acid with the equivalent amount of K-acid, to give the compounds of the general formula wherein the variables have the meaning indicated in Table 10 and which also dye cellulose in a navy blue shade of good allround fastness properties.

TABLE 10

| Example No. | A | E |
|---|---|---|
| 140 | $A_7$ | $E_1$ |
| 141 | $A_7$ | $E_2$ |
| 142 | $A_7$ | $E_3$ |
| 143 | $A_7$ | $E_4$ |
| 144 | $A_7$ | $E_5$ |
| 145 | $A_7$ | $E_6$ |

$A_7$ and $E_1$–$E_6$ in Table 10 have the meaning given in the Examples 5 to 10 and 109.

EXAMPLE 146

The solution of the diazo compound of the amine of formula $A_7$—$NH_2$ obtained according to Example 109 is added dropwise to a suspension of 32 parts of 1-amino-8-hydroxynaphthalene-3,6-disulfonic acid (H-acid) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the tetrazo compound of the amine of formula $H_2N$—$E_1$—$NH_2$ obtained according to Example 5 is slowly added dropwise, while keeping the pH constant at 3–4 by addition of sodium hydroxide solution. When coupling is complete, the dye solution is freed from salt by dialysis and concentrated by evaporation under vacuum, affording the compound of formula

TABLE 11

| Example No. | A | E |
|---|---|---|
| 147 | $A_7$ | $E_2$ |
| 148 | $A_7$ | $E_3$ |
| 149 | $A_7$ | $E_4$ |
| 150 | $A_7$ | $E_5$ |
| 151 | $A_7$ | $E_6$ |

$A_7$ and $E_2$–$E_6$ in Table 11 have the meaning given in the Examples 6 to 10 and 109.

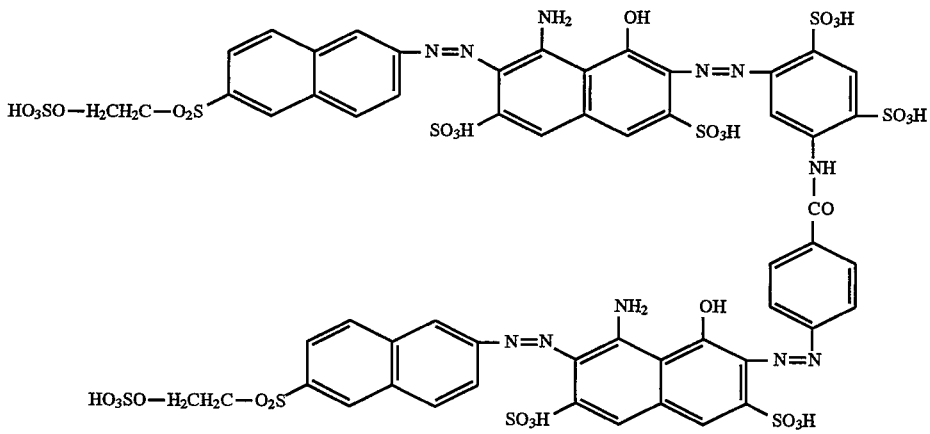

in the form of the free acid as a dark powder, which dyes cellulose in a navy blue shade of good allround fastness properties.

EXAMPLES 147–151

In general accordance with the procedure of Example 146, the dyes of the general formula

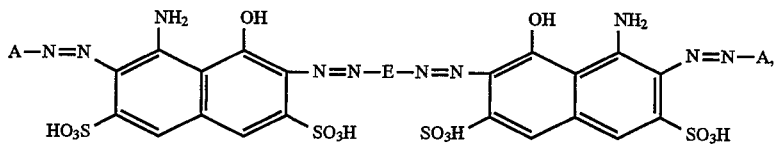

wherein the variables have the meaning indicated in Table 11, can be obtained from the diazo compound of Example 109 and the tetrazo compounds of Examples 6 to 10. These dyes also dye cellulose in a navy blue shade of good allround fastness properties.

EXAMPLES 152–157

The procedure of Examples 146 to 151 is repeated, but replacing the H-acid with the equivalent amount of K-acid, to give the compounds of the general formula

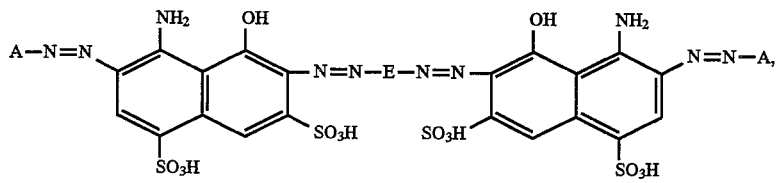

wherein the variables have the meaning indicated in Table 12 and which also dye cellulose in a navy blue shade of good allround fastness properties.

TABLE 12

| Example No. | A | E |
|---|---|---|
| 152 | $A_7$ | $E_1$ |
| 153 | $A_7$ | $E_2$ |
| 154 | $A_7$ | $E_3$ |
| 155 | $A_7$ | $E_4$ |
| 156 | $A_7$ | $E_5$ |
| 157 | $A_7$ | $E_6$ |

$A_7$ and $E_1$–$E_6$ in Table 12 have the meaning given in the Examples 5 to 10 and 109.

EXAMPLE 158

The solution of the diazo compound of the amine of formula $A_1$—$NH_2$ obtained according to Example 1 is added dropwise to a suspension of (32-n) parts of H-acid and n parks of K-acid (n=1–31) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the tetrazo compound of the amine of formula $H_2N$—$E_1$—$NH_2$ obtained according to Example 5 is slowly added dropwise, while keeping the pH constant at 3–4 by addition of sodium hydroxide solution. When coupling is complete, the dye solution is freed from salt by dialysis and concentrated by evaporation under vacuum, affording a mixture of the compounds of formulae

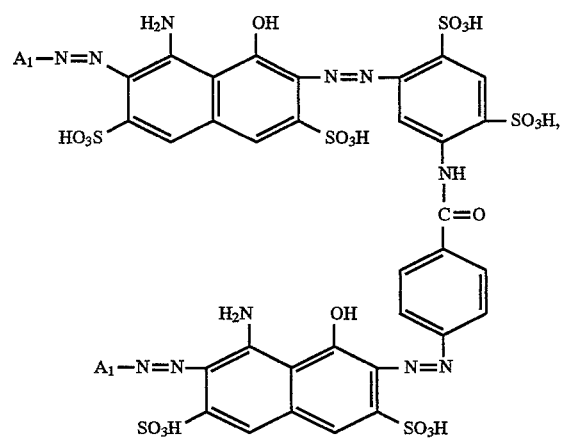

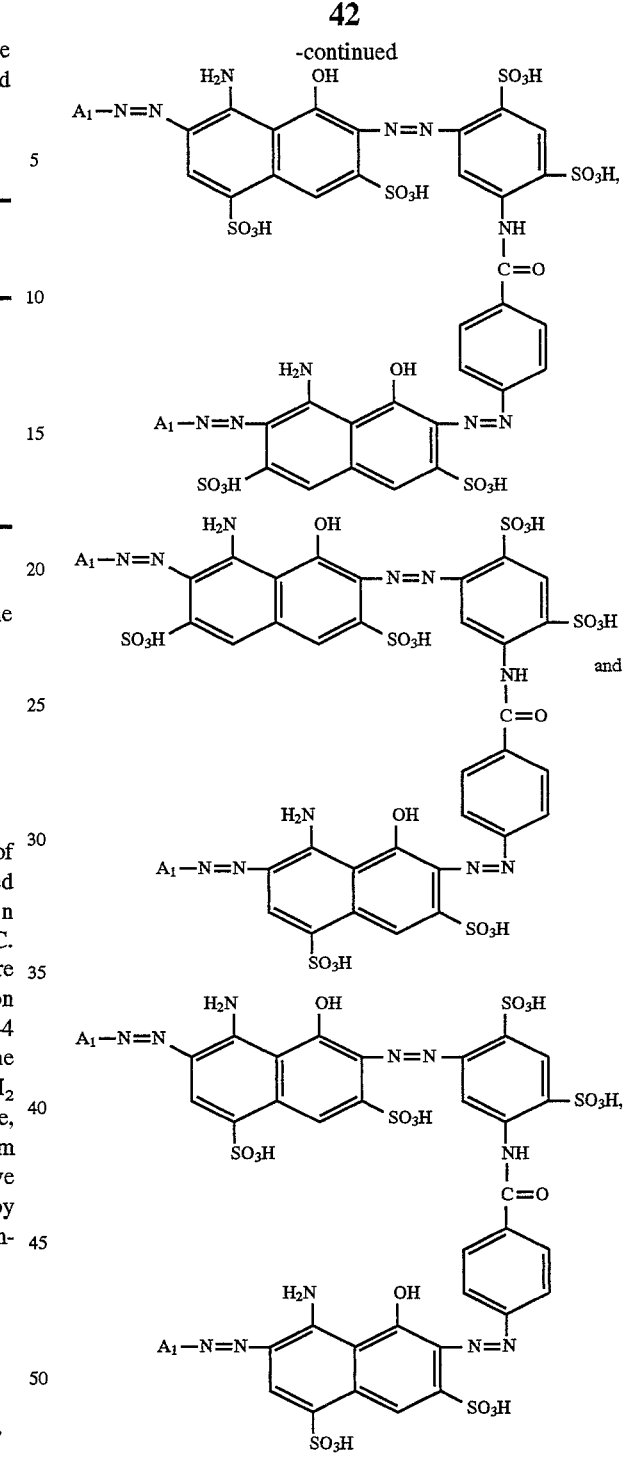

which dyes cellulose in a navy blue shade of good allround fastness properties.

EXAMPLE 159

The solution of the tetrazo compound of the amine of formula $H_2N$—$E_1$—$NH_2$ obtained according to Example 5 is added dropwise to a suspension of (32-n) parts of H-acid and n parts of K-acid (n=1–31) in 100 parts of water at 0°–5° C. The mixture is then allowed to warm to room temperature and is stirred until coupling is complete. The reaction mixture is then cooled to 5°–10° C., the pH is raised to 3–4 with sodium hydroxide solution, and the solution of the diazo compound of the amine of formula $A_1$—$NH_2$m obtained according to Example 1 is slowly added dropwise, while keeping the pH constant at 3–4 by addition of sodium hydroxide solution. When coupling is complete, the dye solution is freed from salt by dialysis and concentrated by evaporation under vacuum, affording a mixture of the compounds of formulae

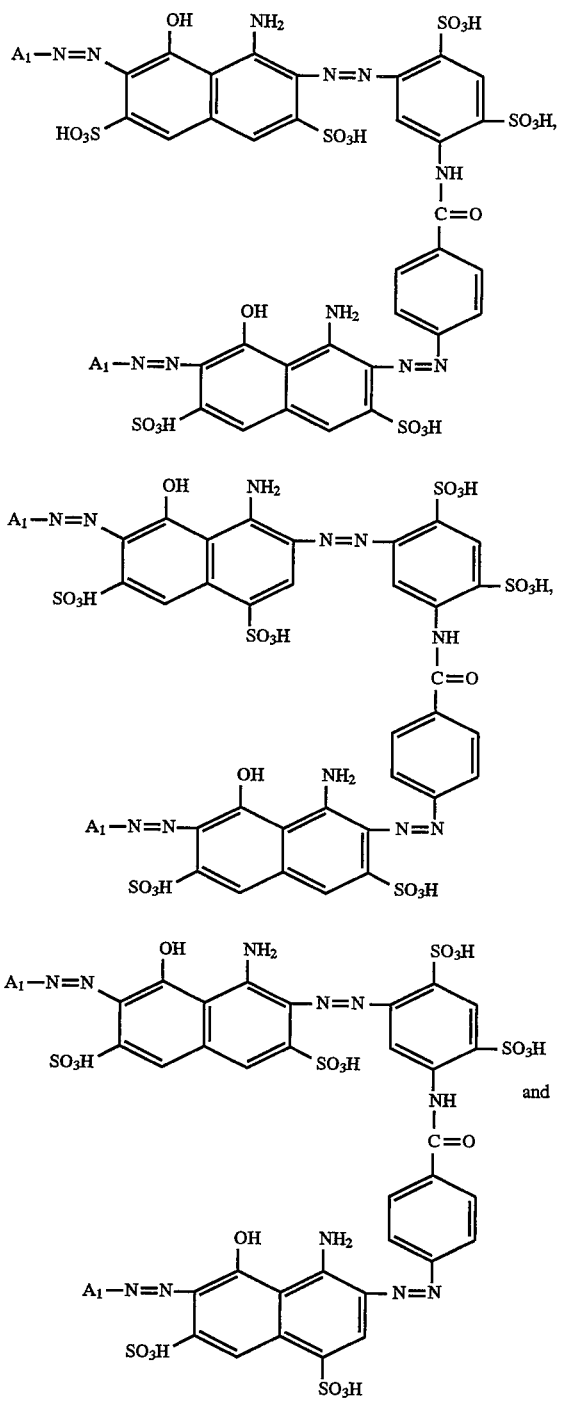

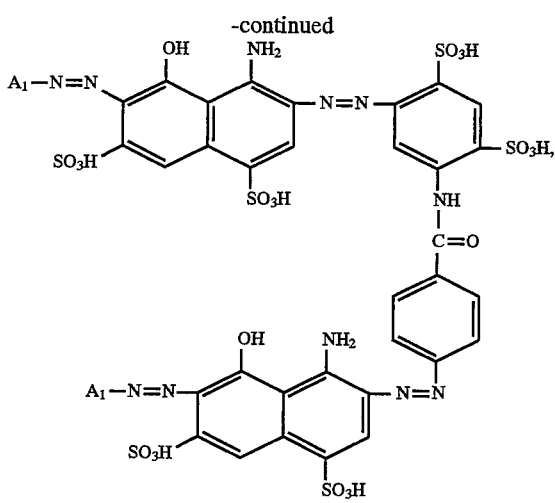

which dyes cellulose in a navy blue shade of good all-round fastness properties.

Dyeing Procedure I 2 parts of the reactive dye obtained in Example 11 are dissolved in 400 parts of water. To this solution are added 1500 parts of a solution which contains 53 g/l of sodium chloride. 100 parts of cotton fabric are put into this dyebath at 40° C. and, after 45 minutes, 100 parts of a solution containing 16 g/l of sodium hydroxide and 20 g/l of calcined sodium carbonate are added. The temperature of the dyebath is kept for another 45 minutes at 40° C. The dyed goods are then rinsed, soaped at the boil for a quarter of an hour with a non-ionic detergent, rinsed again and dried.

Dyeing Procedure II 2 parts of the reactive dye obtained in Example 11 are dissolved in 400 parts of water. To this solution are added 1500 parts of a solution which contains 53 g/l of sodium chloride. 100 parts of cotton fabric are put into this dyebath at 35° C. and, after 20 minutes, 100 parts of a solution containing 16 g/l of sodium hydroxide and 20 g/l of calcined sodium carbonate are added. The temperature of the dyebath is kept for another 15 minutes at 35° C. The temperature is then raised over 20 minutes to 60° C. and kept at this temperature for a further 35 minutes. The dyed goods are then rinsed, soaped at the boil for a quarter of an hour with a non-ionic detergent, rinsed again and dried.

Dyeing Procedure III 8 parts of the reactive dye obtained in Example 11 are dissolved in 400 parts of water. To this solution are added 1400 parts of a solution which contains 100 g/l of sodium sulfate. 100 parts of cotton fabric are put into this dyebath at 25° C. and, after 10 minutes, 200 parts of a solution containing 150 g/l of trisodium phosphate are added. The temperature of the dyebath is then raised over 10 minutes to 60° C. and kept at this temperature for a further 90 minutes. The dyed goods are then rinsed, soaped at the boil for a quarter of an hour with a non-ionic detergent, rinsed again and dried.

Dyeing Procedure IV 4 parts of the reactive dye obtained in Example 11 are dissolved in 50 parts of water. To this solution are added 50 parts of a solution which contains 5 g/l of sodium hydroxide and 20 g calcined sodium carbonate. A cotton fabric is padded with the solution so obtained to a pick-up of 70% and rolled up. The cotton fabric is stored in this manner for 3 hours at room temperature. The dyed fabric is then rinsed, soaped at the boil for a quarter of an hour with a non-ionic detergent, rinsed again and dried.

Dyeing Procedure V 6 parts of the reactive dye obtained in Example 11 are dissolved in 50 parts of water. To this solution are added 50 parts of a solution which contains 16 g/ of sodium hydroxide and 0.04 1 of sodium silicate (38°bé). A cotton fabric is padded with the solution obtained to a pick-up of 70%, rolled up and stored in this manner for 10 hours at room temperature. The dyed fabric is then rinsed, soaped at the boil for a quarter of an hour with a non-ionic detergent, rinsed again and dried.

Dyeing Procedure VI 2 parts of the reactive dye obtained in Example 11 are dissolved in 100 parts of water with the addition of 0.5 parts of sodium m-nitrobenzenesulfonate. A cotton fabric is impregnated with the solution so obtained to a pick-up of 75% and then dried. The fabric is then impregnated with a 20° C. solution which contains 4 g/l of sodium hydroxide and 300 g of sodium chloride and then pinched off to a pick-up of 75%. The dyed fabric is steamed for 30 seconds at 100° to 102° C., rinsed, soaped at the boil for a quarter of an hour with a non-ionic detergent, rinsed again and dried.

Printing Procedure I 3 parts of the reactive dye obtained in Example 11 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2. parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

Printing Procedure II 5 parts of the reactive dye obtained in Example 11 are sprinkled, with rapid stirring, into 100 parts of a stock thickening which contains 50 parts of 5% sodium alginate thickening, 36.5 parts of water, 10 parts of urea, 1 part of sodium m-nitrobenzenesulfonate and 2.5 parts of sodium hydrogen carbonate. A cotton fabric is printed with the printing paste so obtained, the stability of which meets the technical requirements, and dried. The printed fabric is steamed for 8 minutes at 102° C. in saturated steam, then rinsed, if necessary soaped at the boil, then rinsed once more and subsequently dried.

What is claimed is:

1. A compound of the formula

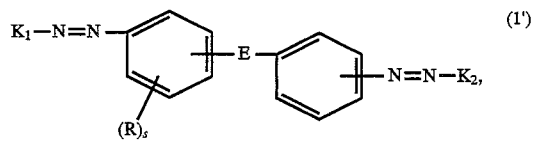
(1')

wherein E is the —NH—CO—, —NH—SO$_2$— or —SO$_2$—NH—SO$_2$— group, (R)$_s$ denotes s identical or different substituents selected from the group consisting of sulfo, hydroxy, $C_1$-$C_4$alkyl, $C_1$-$C_4$alkoxy, halogen and cyano, and s is 0, 1 or 2, $K_1$ and $K_2$ are each independently of the other a radical of the formula

(4c')

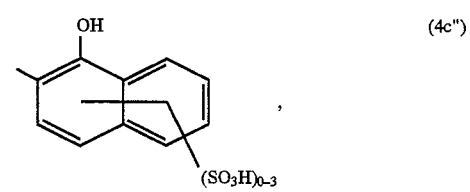
(4c")

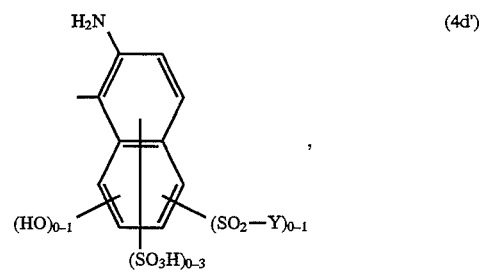
(4d')

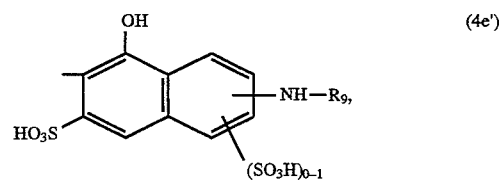
(4e')

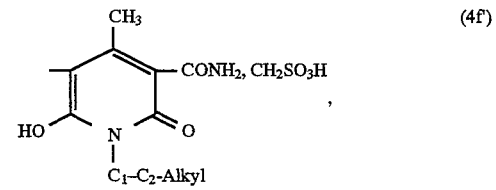
(4f')

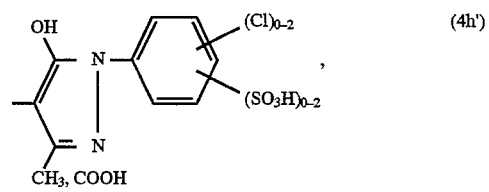
(4h')

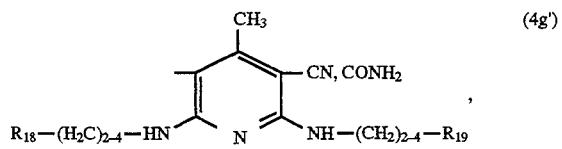
(4g')

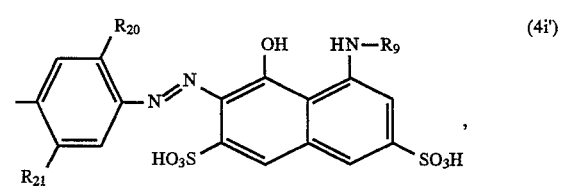
(4i')

-continued

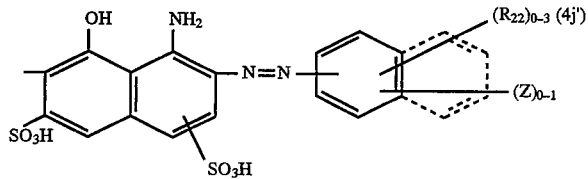

or

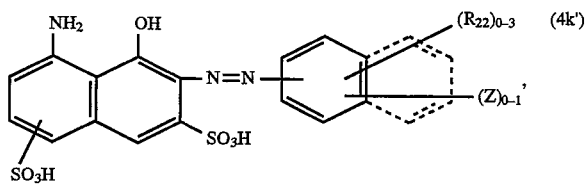

wherein $R_9$ is acetyl, benzoyl or a radical of the formula

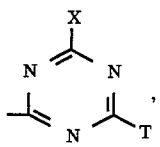

wherein X is halogen, and

T is $C_1$–$C_4$alkoxy; $C_1$–$C_4$alkylthio; hydroxy; amino; N-$C_1$–$C_4$alkylamino which is unsubstituted or substituted in the alkyl moiety by hydroxy, sulfato or sulfo; morpholino; phenylamino or N-$C_1$–$C_4$alkyl-N-phenylamino, wherein alkyl is unsubstituted or substituted by hydroxy, sulfo or sulfato, and phenyl is unsubstituted or substituted by sulfo, carboxy, acetylamino, methyl or methoxy; or T is a fibre-reactive radical of the formula

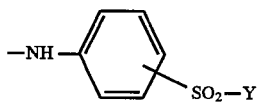

or

$R_{18}$ is hydrogen, hydroxy or sulfato, $R_{19}$ independently has the meaning of $R_{18}$, or $R_{19}$ is a radical of the formula

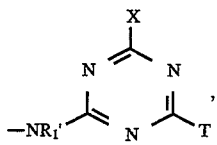

wherein $R_1'$ is hydrogen or $C_1$–$C_4$alkyl and X and T are as defined above, $R_{20}$ and $R_{21}$ are each independently of the other hydrogen, methyl, methoxy, 2-hydroxyethoxy, 2-sulfatoethoxy, acetylamino, propionylamino, ureido or sulfo, $(R_{22})_{0-3}$ is 0 to 3 identical or different radicals $R_{22}$ selected from the group consisting of sulfo, chloro, $C_1$–$C_4$alkyl and $C_1$–$C_4$alkoxy, Y is vinyl, β-bromoethyl, β-chloroethyl, β-acetoxyethyl, β-benzoyloxyethyl, β-phosphatoethyl, β-sulfatoethyl or β-thiosulfatoethyl, Z is a radical of the formula

or

wherein $R_2$ is hydrogen or $C_1$–$C_4$-alkyl, n is an integer from 1 to 6, and Y is as defined above, with the proviso that at least one of $K_1$ and $K_2$ carries a fibre-reactive group, and the proviso that the compound of formula (1') contains at least one sulfo or sulfato group.

2. A compound according to claim 1, of formula

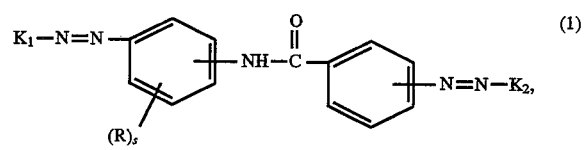

wherein $K_1$, $K_2$ and $(R)_s$ are as defined in claim 1.

3. A compound according to claim 1, wherein R is hydroxy, methyl, methoxy or sulfo, and s is 1 or 2.

4. A compound according to claim 1, wherein $K_1$ and $K_2$ are each independently of the other a radical of formula (4j') or (4k').

5. A compound according to claim 1, wherein $K_1$ and $K_2$ are identical.

6. A compound according to claim 1, of formula

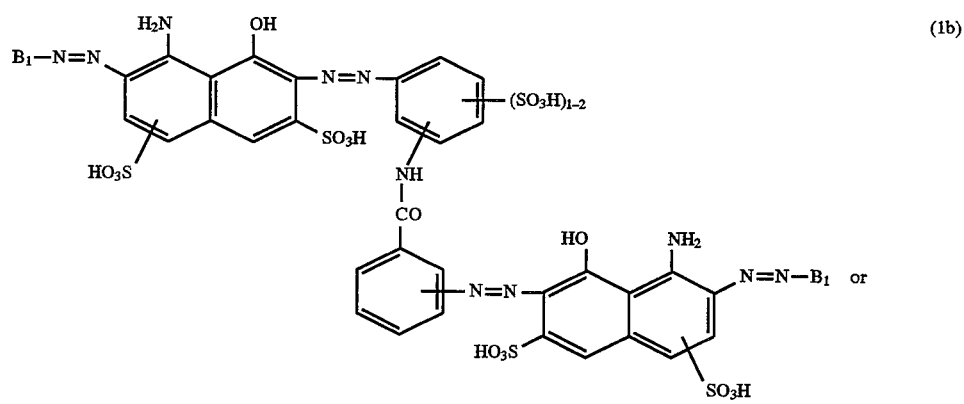

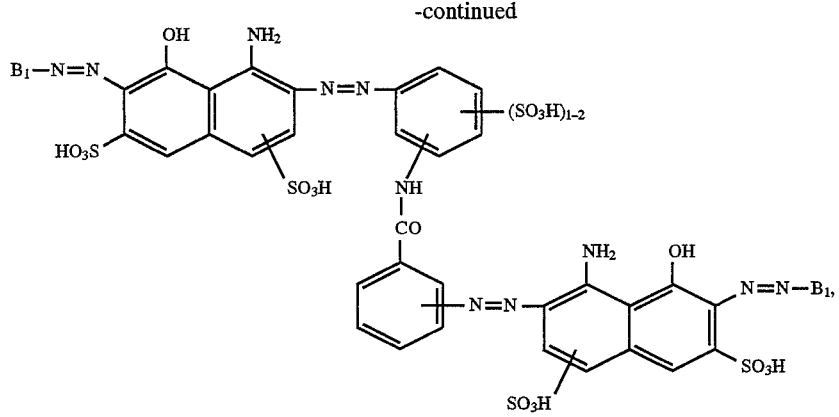
(1c)
wherein $B_1$ is a radical of formula
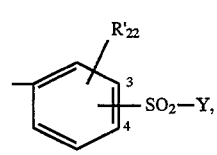
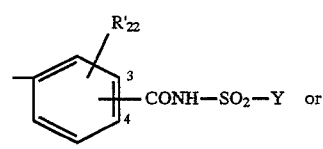
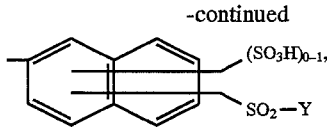
$R'_{22}$ is hydrogen, sulfo, methyl or methoxy, and Y is vinyl or β-sulfatoethyl.
7. A dye formulation comprising two or more than two compounds of formula (1') as claimed in claim 1.
8. A dye formulation according to claim 7, comprising
(a) a compound of formula
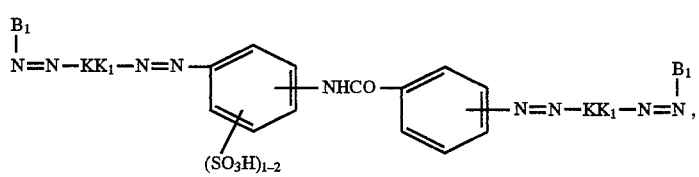
(12a)
b) a compound of formula
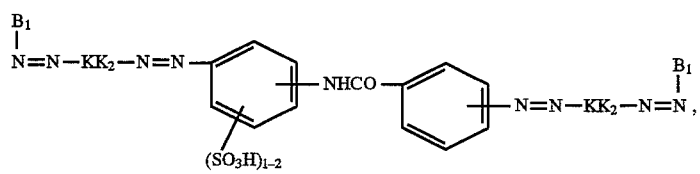
(12b)
c) a compound of formula
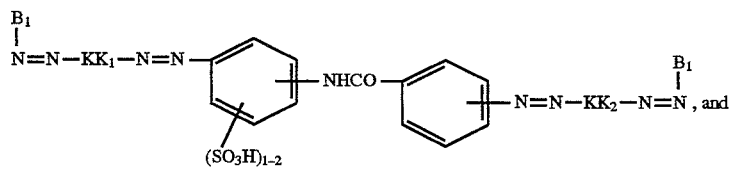
(12c)
d) a compound of formula

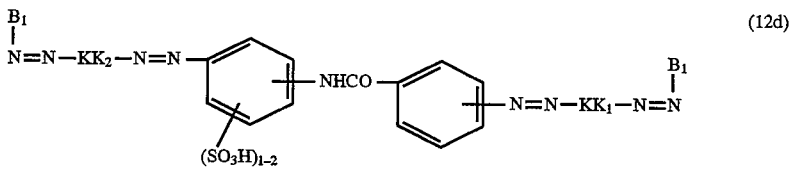
(12d)

wherein $B_1$ is a radical of formula

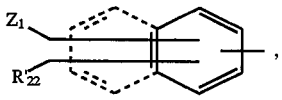
(6a)

$Z_1$ is a radical of formula

—$SO_2$—Y  (2a)

or

—$CONR_2$—$(CH_2)_n$—$SO_2$—Y  (2b), $R_2$ is hydrogen or $C_1$–$C_4$alkyl, n is 2 or 3, Y is vinyl or β-sulfatoethyl, $R'_{22}$ is hydrogen, sulfo, chloro, $C_1$–$C_4$alkyl or $C_1$–$C_4$alkoxy, KK1 is the radical of 1-amino-8-hydroxynaphthalene-3,6-disulfonic acid (H-acid), and KK2 is the radical of 1-amino-8-hydroxynaphthalene-4,6-disulfonic acid (K-acid).

9. A process for the preparation of a compound of formula (1') as claimed in claim 1, which comprises tetrazotising about 1 molar equivalent of the compound of formula

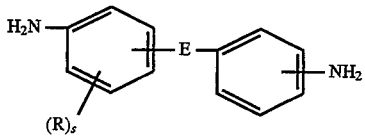
(7)

with a nitrite in acid medium and coupling the tetrazotised compound with about 1 molar equivalent of a coupling component of formula $K_1$—H  (8)

and about 1 molar equivalent of a coupling component of formula $K_2$—H  (9), wherein E, R, $K_1$, $K_2$ and s have the meanings as claimed in claim 1.

10. A process for dyeing or printing a hydroxyl group-containing or nitrogen-containing fibre material which comprises applying to the fibre material a compound of formula (1') according to claim 4 as a fibre-reactive dye.

11. A process according to claim 10 for dyeing or printing a cellulosic fibre material.

* * * * *